(12) United States Patent
Kong et al.

(10) Patent No.: US 12,524,039 B2
(45) Date of Patent: Jan. 13, 2026

(54) CLOCK CALIBRATION FOR HIGH-SPEED SERIAL-LINK TRANSMITTERS

(71) Applicant: Avago Technologies International Sales Pte. Limited, Singapore (SG)

(72) Inventors: Derui Kong, Irvine, CA (US); Wei Zhang, Irvine, CA (US); Seong-Ho Lee, Aliso Viejo, CA (US); Sanghye Chung, Irvine, CA (US); Delong Cui, Tustin, CA (US); Jingguang Wang, Laguna Niguel, CA (US); Kambiz Vakilian, Irvine, CA (US); Jun Cao, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 42 days.

(21) Appl. No.: 18/604,455

(22) Filed: Mar. 13, 2024

(65) Prior Publication Data
US 2025/0291381 A1   Sep. 18, 2025

(51) Int. Cl.
*G06F 1/12* (2006.01)
*G06F 1/08* (2006.01)
*H03K 17/567* (2006.01)

(52) U.S. Cl.
CPC ............ *G06F 1/12* (2013.01); *G06F 1/08* (2013.01); *H03K 17/567* (2013.01)

(58) Field of Classification Search
CPC ............ G06F 1/12; G06F 1/08; H03K 17/567
See application file for complete search history.

(56) References Cited

U.S. PATENT DOCUMENTS

| | | | |
|---|---|---|---|
| 6,215,835 B1 * | 4/2001 | Kyles | H03L 7/07 375/376 |
| 6,466,096 B1 * | 10/2002 | DeVito | H03L 7/087 331/11 |
| 6,700,944 B1 * | 3/2004 | Chlipala | H03D 13/004 375/376 |

(Continued)

OTHER PUBLICATIONS

Kim, Y. et al., A 2.3-mW 0.01-mm2 1.25-GHz Quadrature Signal Corrector With 1.1-ps Error for Mobile DRAM Interface in 65-nm CMOS, IEEE Transactions on Circuits and Systems-II: Express Briefs, 2017, 64(4):397-401.

(Continued)

*Primary Examiner* — Faisal M Zaman
(74) *Attorney, Agent, or Firm* — Quarles & Brady LLP

(57) ABSTRACT

A clock calibrator comprises an input port configured to receive a two-level symbol from a quarter-rate transmitter, the two-level symbol having a period of P unit intervals with a first rising edge launched by one quarter-rate clocks. The clock calibrator includes a clock generator configured to generate four calibration clocks based on the quarter-rate clocks, each calibration clock having the period of P UIs and sequentially having a calibration rising edge delayed by M UIs. The clock calibrator includes a delay-tuner configured to retime the calibration rising edge and a phase detector configured to determine a coarse parameter and a k-th fine parameter based on alignment between the retimed calibration rising edge and the first rising edge with (k−1)M UIs delay. Here P is an integer multiple of 4, M is one less than an integer multiple of 4, and k is selected from 1, 2, 3, and 4.

19 Claims, 12 Drawing Sheets

P: any integer of multiples of 4
M: 1 less than multiples of 4

(56) References Cited

U.S. PATENT DOCUMENTS

| | | | | |
|---|---|---|---|---|
| 7,539,243 B1* | 5/2009 | Toifl | H04L 25/03057 | 327/554 |
| 7,697,652 B2* | 4/2010 | Jeong | H03D 13/004 | 375/376 |
| 7,742,553 B1* | 6/2010 | Bataineh | H03L 7/113 | 455/260 |
| 9,860,087 B1* | 1/2018 | Francese | H04L 25/03057 | |
| 9,942,028 B1* | 4/2018 | Dickson | H04L 25/03885 | |
| 10,536,259 B1* | 1/2020 | Kenyon | H04L 7/0025 | |
| 10,840,917 B1* | 11/2020 | Cali | H03L 7/093 | |
| 12,348,344 B1* | 7/2025 | Kansal | H04L 27/04 | |
| 2009/0002082 A1* | 1/2009 | Menolfi | H03L 7/0995 | 331/57 |
| 2009/0251181 A1* | 10/2009 | Bae | H03L 7/06 | 327/156 |
| 2012/0013374 A1* | 1/2012 | Lin | H03L 7/081 | 327/147 |
| 2014/0126678 A1* | 5/2014 | Cirit | H04L 7/0337 | 375/375 |
| 2019/0172509 A1* | 6/2019 | Kang | G06F 3/0653 | |
| 2022/0191001 A1* | 6/2022 | Poulsen | H04L 7/0331 | |
| 2023/0099269 A1* | 3/2023 | Jain | H03K 5/135 | 713/500 |
| 2024/0146502 A1* | 5/2024 | Pan | H03L 7/0814 | |

OTHER PUBLICATIONS

Kim, T. et al., A Low-Voltage Area-Efficient TSV I/O for HBM with Data Rate Up to 15Gb/s Featuring Overlapped Multiplexing Driver, ISI Compensators and QEC, 2023 Symposium on VLSI Technology and Circuits Digest of Technical Papers, IEEE, 2023, pp. 1-2.

Sull, J. et al., A 10-to-12-GHZ Dual Loop Quadrature Clock Corrector in 28-nm CMOS Technology, 37th International Technical Conference on Circuits/Systems, Computers and Communications (ITC-CSCC), IEEE, 2022, pp. 571-573.

Valero-Lopez, A. et al., Self-Calibrated Quadrature Generator for WLAN Multistandard Frequency Synthesizer, IEEE Journal of Solid-State Circuits, 2006, 41(5):1031-1041.

Yoon, H. et al., A 3.2-12.8Gb/s Duty-Cycle Compensating Quadrature Error Corrector for DRAM Interfaces, With Fast Locking and Low Power Characteristics, IEEE 47th European Solid State Circuits Conference (ESSCIRC), IEEE, 2021, pp. 463-466.

European Patent Office, Extended Search Report, Application No. 25162871.5, Jul. 30, 2025, 12 pages.

* cited by examiner

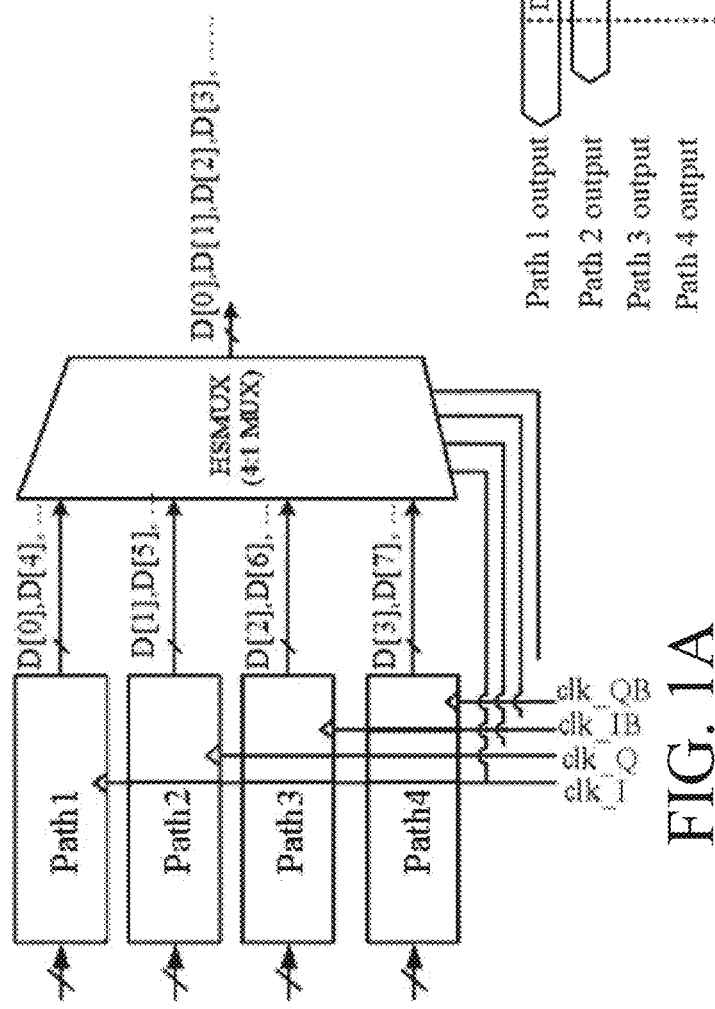
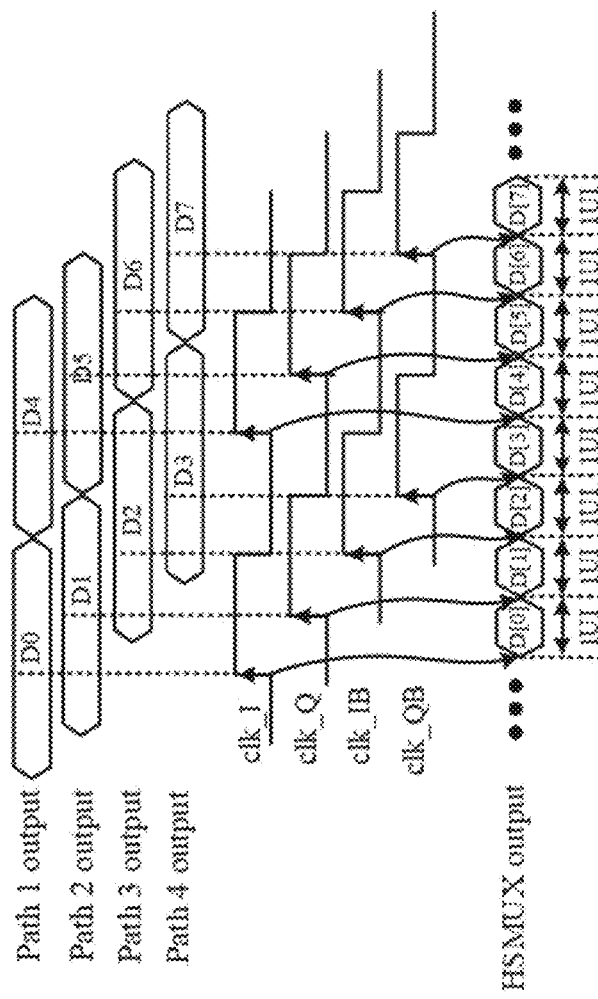
FIG. 1A
FIG. 1B

CLOCK CALIBRATION FOR HIGH-SPEED SERIAL-LINK TRANSMITTERS

FIELD OF INVENTION

The subject technology is directed to high-speed serial-link devices and methods of clock calibration.

BACKGROUND OF THE INVENTION

Wireline communication is the backbone of internet infrastructure, connecting homes, businesses, and data centers with high-speed internet services. Transceivers are components in network communication, converting the electrical signals used within a computer into a form that can be transmitted over a network cable and vice versa. The demand for higher data rates is driven by the ever-increasing need for bandwidth due to video streaming, cloud computing, and other data-intensive applications. The communication channel is divided into multiple lanes, each capable of carrying a separate stream of data. Emerging Institute of Electrical and Electronics Engineers (IEEE) standards in wireline communication requires transceivers to operate at 224 Gbps and beyond per lane. Because the UI (unit interval) period of data symbol in 224 Gbps PAM4 transceiver is 8.9 ps, such small UI period places strict requirement on the quality of clocks. IEEE 802.3 standard specifies very strict transceiver specifications, such as EOJ (even-odd jitter) and DJ (deterministic jitter) that are difficult to pass without calibration. Quarter-rate architecture is preferred for high-speed transmitters as it relaxes the clock speed requirement. However, IQ (in-phase component and quadrature component) mismatch and DCD (duty-cycle distortion) error of the quarter-rate clocks makes it difficult to meet the EOJ related clock specifications. Therefore, a new clock calibration technique for mitigating the IQ mismatch and DCD error in quarter-rate transmitter architecture is desired.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 1A is a simplified block diagram of a transmitted data path split into four quarter-rate paths combined by a 4:1 high-speed time-multiplexer.

FIG. 1B is a timing diagram of each quarter-rate path launching 1 of every 4 data symbols with one of the quarter-rate clocks.

DETAILED DESCRIPTION OF THE INVENTION

Figure 2:
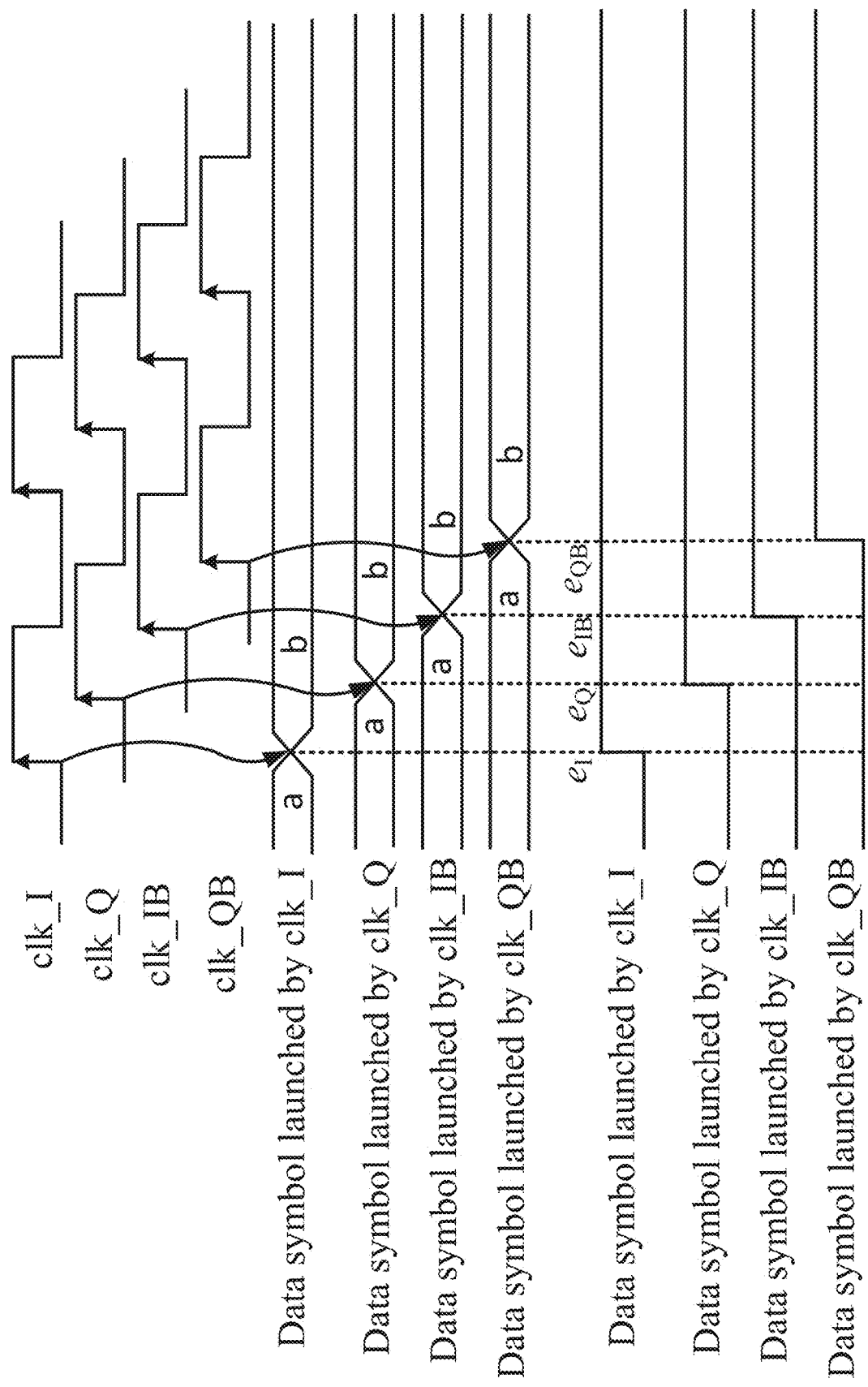
FIG. 2 is a timing diagram of low-speed two-level data symbols with a period of P UI launched by respective one of the quarter-rate clocks in the transmitted data path in association with timing errors shown at the transmitter output.

The subject technology provides a clock calibrator configured to receive two-level symbols either directly from a transmitted data path or a replica data path. The clock calibrator also includes a clock generator configured to generate four calibration clocks internally based on the quarter-rate clocks, each calibration clock having the same period of the two-level data symbols with certain time delays. The clock calibrator also includes a delay tuner configured to retime the calibration clock's rising edge and a phase detector configured to determine a coarse parameter and a set of fine parameters based on alignment between the calibration clock's retimed rising edge and the two-level data symbol's rising edge with a designed time delay. The clock calibration of the quarter-rate transmitter can be performed in both foreground and background fashions. There are additional embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Similarly, when an element is referred to herein as being "bonded" to another element, it is to be understood that the elements can be directly bonded to the other element (without any intervening elements) or have intervening elements present between the bonded elements. In contrast, when an element is referred to as being "directly bonded" to another element, it should be understood that no intervening elements are present in the "direct" bond between the elements. However, the existence of direct bonding does not exclude other forms of bonding, in which intervening elements may be present.

Likewise, when an element is referred to herein as being a "layer," it is to be understood that the layer can be a single layer or include multiple layers. For example, a conductive layer may comprise multiple different conductive materials or multiple layers of different conductive materials, and a dielectric layer may comprise multiple dielectric materials or multiple layers of dielectric materials. When a layer is described as being coupled or connected to another layer, it is to be understood that the coupled or connected layers may include intervening elements present between the coupled or connected layers. In contrast, when a layer is referred to as being "directly" connected or coupled to another layer, it should be understood that no intervening elements are present between the layers. However, the existence of directly coupled or connected layers does not exclude other connections in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

As used herein, a clock generator in digital circuits is a component responsible for producing a clock signal used to synchronize the operations of various components within the system. The clock signal it generates is typically a periodic, square wave with a rising edge and a falling edge in each period, which serves as the heartbeat for the system, dictating the timing of data transfers, processing steps, and other critical operations. Quarter-rate clocks in digital systems refer to a specific configuration of clock signals used primarily in high-speed data transmission and processing applications. In this configuration, the data rate is four times the frequency of the clock signal. This means that for every cycle of the clock, four bits of data are transmitted or processed. A delay-tuner in digital circuits is a specialized component or mechanism designed to adjust and control the timing of signals. Its primary function is to introduce a precise amount of delay to a digital signal, which can be crucial in synchronizing various parts of a circuit. This is particularly important in high-speed digital systems, where even nanosecond-level differences can impact performance. One example of the delay-tuner referred herein is a tunable on-chip delay (TOD) circuit configured to perform a digitally controlled tuning process (e.g., using inverter buffers and tunable capacitors) to adjust delays for the selected clock. A phase detector is a component used in electronic systems, particularly in the domain of signal processing and communication. It is designed to measure (e.g., using rising edge of the signal) the difference in phase between two signals or to detect the phase shift of a single signal in relation to a reference. In digital systems, the phase detectors often employ logic circuits to compare the phase of digital signals. A time-multiplexer (abbreviated as MUX herein) is a component in digital signal processing and communication systems. Its primary function is to efficiently manage multiple data streams by combining them into a single, high-speed data stream. This process allows multiple signals to share a common transmission medium while still maintaining their distinct identities.

One general aspect includes a circuit for clock calibration. The circuit includes a clock generator configured to receive two-level data symbols from a transmitted data path driven by four quarter-rate clocks and to generate four calibration clocks internally based on the four quarter-rate clocks, each calibration clock having a same period of the two-level data symbols with certain time delays. The circuit also includes a delay tuner configured to retime a rising edge of one of the four calibration clocks. The circuit also includes a phase detector combined with the delay tuner in a feedback loop to determine a coarse parameter and a set of fine parameters based on an alignment between a retimed rising edge of the calibration clock and a rising edge of the two-level data symbol with a corresponding time delay, where the set of fine parameters are used for calibrating the four quarter-rate clocks.

Implementations may include one or more of the following features. In the clock generator, an n-th one of the two-level data symbols has a period of P unit intervals (UIs) with a rising edge launched by an n-th one of the four quarter-rate clocks, where P is an integer multiple of 4 and n is sequentially selected from 1, 2, and 3. The clock generator may include a divider configured to divide down by 2 from the four quarter-rate clocks into eight clocks each having a period of 8 UIs and sequentially time-shifted by one UI, to separate the eight clocks to four pairs of complementary clocks each pair having 4-UI spacing from each other, and to divide down by P/8 using rising edge and falling edge of the first one of the eight clocks to generate two secondary clocks each having a period of P UIs and a spacing of 4 UIs. The clock generator further may include four differential flip-flop circuits arranged in a layout with a first flip-flop circuit being configured to retime a first secondary clock in association with the first pair of complementary clocks to output a first calibration clock, a second flip-flop circuit being configured to retime the first calibration clock in association with the third pair of complementary clocks to output a third calibration clock that is 2M UIs away from the first calibration clock, a third flip-flop circuit being configured to retime the second secondary clock in association with the fourth pair of complementary clocks to output a second calibration clock that is M UIs away from the first calibration clock, and a fourth flip-flop circuit being configured to retime the second calibration clock in association with the second pair of complementary clocks to output a fourth calibration clock that is 3M UIs away from the first calibration clock. The clock generator may include a 4-to-1 time-multiplexer configured to have four inverters with high-impedance in mega Ω range respectively receiving the four calibration clocks and to select a k-th calibration clock of the four calibration clocks having a calibration rising edge launched at respective $(k-1)M$ UIs delay upon a control signal applied to the respective four inverters, where m is one less than an integer multiple of 4 and k is selected from 1, 2, 3, and 4 for each selection of n. The delay-tuner may include a first tunable delay circuit configured to set a range of the alignment between the retimed rising edge of the calibration clock and a rising edge launched by the n-th quarter-rate clock having respective $n-1+(k-1)M$ UIs delay by setting an n-th coarse parameter, and a second tunable delay circuit configured to determine a $(k+4(n-1))$-th fine parameter by achieving the alignment within the range over L stages each having N linear steps, each step being 40 fs or smaller, where L and N are integers, the k=1, 2, 3, 4 for each n=1, 2, 3. Each of the L stages may include two inverters in serial configuration followed by a tunable capacitor in shunt configuration, where the tunable capacitor may include N branches of transistor switches and MOS capacitors, the transistor switches being independently turned on or off by digital control signals. The clock generator further may include a first dummy load added after the second flip-flop circuit and a second dummy load added after the fourth flip-flop circuit to achieve load balance.

Another general aspect includes a method for calibrating clocks for a quarter-rate transmitter. The method includes generating three two-level data symbols from a transmitted data path driven by four quarter-rate clocks, each two-level data symbol having a rising edge launched by one of the four quarter-rate clocks. The method also includes generating four calibration clocks in a calibration path based on the four quarter-rate clocks, each of the four calibration clocks having a same period of the two-level symbols and sequential time delays. The method also includes retiming the calibration rising edge based on a feedback signal to yield a retimed rising edge. The method also includes shifting the rising edge of the two-level data symbol to have a shifted rising edge having additional delay. The method also includes comparing the retimed rising edge with the shifted rising edge to generate the feedback signal until an alignment between the corresponding two rising edges is reached.

Implementations may include one or more of the following features. The method may include: selecting an n-th one of the three two-level data symbols having a period of P unit intervals (UIs) with the rising edge launched by the n-th one of the four quarter-rate clocks, where P is an integer multiple of 4, n is selected from 1, 2, 3; selecting a k-th one of the four calibration clocks with a calibration rising edge having a time delay of $(k-1)M$ UIs, where M is one less than an integer multiple of 4, k is selected from 1, 2, 3, 4; shifting the rising edge launched by the n-th one of the four quarter-rate clocks to obtain a shifted rising edge having a time delay of $n-1+(k-1)M$ UIs; recording $(k+4(n-1))$-th fine parameters per each n-th coarse parameter associated with the retimed rising edge and the shifted rising edge based on the alignment; deriving a first error associated with a mismatch between in-phase and quadrature parts of the quarter-rate clocks based on at least the first through 8-th fine parameters; and deriving a second error associated with duty-cycle of in-phase part of the quarter-rate clocks based on at least the first, third, 9-th, and 11-th fine parameters; and deriving a third error associated with duty-cycle of quadrature part of the quarter-rate clocks based on at least the second, fourth, 10-th, and 12-th fine parameters; where the first error, the second error, and the third error are independent from skews in the four calibration clocks. The method may include: making error corrections to the quarter-rate clocks based on the first error, the second error, and the third error; determining calibrated quarter-rate clocks through iterations; and transmitting data symbols launched by the calibrated quarter-rate clocks. Retiming the rising edge of the k-th calibration clock may include using a coarse delay tuner configured to determine a first coarse parameter defining a range of the alignment between the retimed rising edge and the shifted rising edge for k=1, using a fine delay tuner to determine a first fine parameter within the range, the first fine parameter being tunable based on L stages each yielding N linear steps and each step size being 40 fs or smaller, then fixing the first coarse parameter to tune the fine delay tuner to respectively determine subsequent three fine parameters for k=2, 3, and 4. The method may include: deriving a first error associated with a mismatch between in-phase and quadrature parts of the quarter-rate clocks based on calculating a first sum of the first fine parameter minus the second fine parameter plus the third fine parameter minus the fourth fine parameter plus the sixth fine parameter minus the fifth fine parameter plus the eighth fine parameter minus the seventh fine parameter, and dividing the first sum by 4; and deriving a second error associated with duty-cycle of in-phase part of the quarter-rate clocks based on calculating a second sum of the first fine parameter minus the third fine parameter plus the fourth fine parameter minus the second fine parameter plus the seventh fine parameter minus the fifth fine parameter plus the sixth fine parameter minus the eighth fine parameter, and dividing the second sum by 2; and deriving a third error associated with duty-cycle of quadrature part of the quarter-rate clocks based on calculating a third sum of the third fine parameter minus the first fine parameter plus the fourth fine parameter minus the second fine parameter plus the fifth fine parameter minus the seventh fine parameter plus the sixth fine parameter minus the eighth fine parameter, and dividing the third sum by 2. Deriving each of the first error, the second error, and the third error is independently from each n-th coarse parameter and any offset of comparing the retimed rising edge with the shifted rising edge. Generating the four calibration clocks may include dividing down the four quarter-rate clocks into eight clocks each having a period of 8 UIs and one UI sequential delay; separating the eight clocks to four pairs of complementary clocks, each pair including two of the eight clocks separated by 4 UIs; dividing down by p/8 from the first clock of the eight clocks via its rising edge and falling edge to generate two secondary clocks each having a period of P UIs and a spacing of 4 UIs; generating the first calibration clock using a first differential flip-flop block configured to retime a first one of the two secondary clocks based on a first pair of complementary clocks including the first clock with 0 delay and the fifth clock with 4 UIs delay; generating the second calibration clock using a third differential flip-flop block configured to retime a second one of the two secondary clocks based on a fourth pair of complementary clocks including the fourth clock with 3 UIs time delay and the eighth clock with 7 UIs delay; generating the third calibration clock using a second differential flip-flop block configured to retime the first calibration clock based on a third pair of complementary clocks including the third clock with 2 UIs delay and the seventh clock with 6 UIs delay; and generating the fourth calibration clock using a fourth differential flip-flop block configured to retime a second calibration clock based on a second pair of complementary clocks including the second clock with 1 UI delay and the sixth clock with 5 UIs delay. Retiming the rising edge of the k-th calibration clock may include using a coarse delay tuner to determine a first coarse parameter defining a range of the alignment between the retimed rising edge and the shifted rising edge for k=1. Retiming also includes using a fine delay tuner to determine a first fine parameter within the range. The first fine parameter is tunable based on L stages each yielding N linear steps and each step size being 40 fs or smaller. Retiming further includes fixing the first coarse parameter to tune the fine delay tuner to respectively determine subsequent three fine parameters for k=2, 3, and 4.

One general aspect includes a circuit for clock calibration in background. The circuit also includes a replica data path coupled to a tap of a transmitted data path, the replica data path being configured to generate a two-level data symbol based on quarter-rate clocks used for data communication in the transmitted data path, the two-level data symbol having a period of P unit intervals (UIs) with a rising edge launched by n-th quarter-rate clock, where P is an integer multiple of 4 and n is sequentially selected from 1, 2, and 3. The circuit also includes a clock generator configured to generate four calibration clocks based on the quarter-rate clocks, each calibration clock having the period of P UIs and being M UIs spaced apart, and to sequentially select a k-th calibration clock of the four calibration clocks having a rising edge launched at respective (k−1)M UIs delay, where M is one less than an integer multiple of 4 and k is selected from 1, 2, 3, and 4 for each selection of n. The circuit also includes a delay-tuner configured to tune the rising edge of the k-th calibration clock based on a feedback signal to yield a retimed rising edge. The circuit also includes a phase detector configured to generate the feedback signal by comparing the retimed rising edge with the rising edge launched by the n-th quarter-rate clock having respective n−1+(k−1)M UIs delay and to determine an n-th coarse parameter and respective (k+4(n−1))-th fine parameters based on alignment of the corresponding two rising edges.

Implementations may include one or more of the following features. The circuit where the replica data path may include four quarter-rate data paths and a 4-to-1 time-multiplexer circuit, each quarter-rate data path being configured to generate one of 4 pairs of differential data inputs with the period of P UIs and consecutive 1 UI time delay, each pair of differential data inputs being launched by respective one of the four quarter-rate clocks, each pair of differential data inputs may include a first data input and a second data input inverted with an opposite phase of the first data input. The 4-to-1 time-multiplexer circuit may include a retimer that includes four sets of flip-flop and latch circuits respectively in the four quarter-rate data paths, the retimer being configured to retime a first set of 4 first data inputs respectively from the 4 pairs of differential data inputs using respect rising edges of the four quarter-rate clocks to generate a first set of 4 third data inputs having consecutively 1 UI delay, and to further retime the first set of 4 third data inputs using the respect subsequent falling edges of the four quarter-rate clocks to generate a second set of 4 fourth data inputs having consecutively time-shifted by 1 UI, one of the 4 fourth data inputs being shifted by 2 UIs from respective one of the 4 third data inputs. The retimer further is configured to retime a second set of 4 second data inputs respectively from the 4 pairs of differential data inputs using respect rising edges of the four quarter-rate clocks to generate a third set of 4 fifth data inputs having consecutively 1 UI delay, and to further retime the third set of 4 fifth data inputs using respect subsequent falling edges of the four quarter-rate clocks to generate a fourth set of 4 sixth data inputs having consecutively 1 UI delay, one of the 4 sixth data inputs being shifted by 2 UIs from respective one of the 4 fifth data inputs. The 4-to-1 time-multiplexer circuit further may include a first logic selector circuit configured to generate a first data output based on the first set of the 4 third data inputs and the second set of the 4 fourth data inputs, and a second logic selector circuit configured to generate a second data output based on the third set of the four fifth data inputs and the fourth set of the 4 sixth data inputs, the first data output and the second data output being complementary to each other to form a single-bit two-level data symbol with the period of P UIs and a rising edge optionally being triggered by one of the four quarter-rate clocks.

FIG. 1A is a simplified block diagram of a transmitted data path split into four quarter-rate paths combined by a 4:1 high-speed time-multiplexer (HSMUX). A time multiplexer, often referred to simply as a multiplexer (MUX), is a device in telecommunications and signal processing that efficiently combines multiple input signals into a single output signal (often referred as "symbol") with respective allocation of different time intervals, known as time slots, to different input signals, thereby allowing them to share a common transmission path. A quarter-rate transmitter is a type of digital signal transmitter used in high-speed data communication systems. It operates at a frequency that is one-fourth (or a quarter) of the symbol rate of the signal it is transmitting. In a quarter-rate transmitter, if the symbol transmission rate is, for example, 10 Giga-baud per second, the operating frequency of the transmitter's internal circuitry would be 2.5 GHz. The quarter-rate transmitter employs four quarter-rate clocks that are 90° out of phase of one another, respectively denoted as clk_I, clk_Q, clk_IB, clk_QB. Each quarter-rate clock has a period of 4 unit intervals (UIs). The UI is the time duration for one symbol in a serial data stream. It is essentially the inverse of the symbol transmission rate (baud rate). The transmitted data path is split into four quarter-rate paths, namely Path1, Path2, Path3, Path4. Each quarter-rate path launches 1 of every 4 data symbols with one of the quarter-rate clocks. For example, as shown in FIG. 1B of a simplified timing diagram, Path1 output includes sequentially a first data symbol D0 followed by a fifth data symbol D4 and so on. Path2 output includes a second data symbol D1 followed by a sixth data symbol D5 and so on. Path3 output includes a third data symbol D2 followed by a seventh data symbol D6 and so on. Path4 output includes a fourth data symbol D3 followed by an eighth data symbol D7 and so on. In other words, the data symbols from each quarter-rate path are time-interleaved by 1 UI and has minimum symbol period of 4 UI.

The 4:1 HSMUX is configured to time-multiplexed the outputs of the four quarter-rate paths into one full-rate path of data symbols with minimum symbol period of 1 UI. As shown in FIG. 1B, the time-multiplex operation is done by using a rising edge of the quarter-rate clocks to respectively launch the individual data symbol consecutively received as an input from respective one of the four quarter-rate paths. For example, the first quarter-rate clock clk_I is using its rising edge to launch the first data symbol D0. The second quarter-rate clock clk_Q is using its rising edge to launch the second data symbol D1 at 1 UI delay, and so on. The next rising edge of the first quarter-rate clock clk_I again is used to launch the fifth data symbol D4 at another 1 UI delay, the next rising edge of the second quarter-rate clock clk_Q again is used to launch the sixth data symbol D5 at another 1 UI delay, and so on to provide the full-rate data symbols as the HSMUX output.

Ideally, the transitions edges of full-rate data symbols after the transmitter (TX) output are spaced by integer multiples of 1UI. In practice, as each data symbol transition is launched by one of the four quarter-rate clocks, deterministic clock error of the quarter-rate clocks as well as the mismatches inside the HSMUX introduce timing error into these transition edges. FIG. 2 is a timing diagram of low-speed two-level data symbols with a period of P UI launched by respective one of the quarter-rate clocks in the transmitted data path in association with timing errors shown at the transmitter output. Two-level data symbols are a fundamental concept in digital communications, representing the simplest form of signaling used to convey information in binary systems. In essence, these symbols correspond to one of two distinct states or levels. As shown in FIG. 2, the timing errors of $e_I$, $e_Q$, $e_{IB}$, $e_{QB}$ at TX output data is respectively associated with the symbol transition edges. For example, $e_Q$ is associated with output transitions launched by quarter-rate clock clk_Q. These timing errors, depending on the source, are categorized into two types: 1) IQ mismatch error $e_{IQ}$; 2) DCD error $e_{DCD\_I}$. IQ mismatch error arises from the mismatch between in-phase (clk_I and clk_IB) and quadrature (clk_Q and clk_QB) parts of the quarter-rate clocks as shown in Formula (1) below:

$$e_{IQ} = \frac{e_I - e_Q + e_{IB} - e_{QB}}{2} \qquad (1)$$

DCD error arises from the duty cycle error of quarter-rate clocks as shown in Formula (2) below:

$$e_{DCD\_I} = e_I - e_{IB} \quad e_{DCD\_Q} = e_Q - e_{QB} \qquad (2)$$

Both the IQ mismatch and DCD error are contributed from the quarter-rate clock as well as from the HSMUX internal mismatch. These errors make the quarter-rate architecture in the high-speed transmitters difficult to meet the even-odd jitter (EOJ) related clock specifications.

Traditional quarter-rate transmitters are typically not equipped with clock calibration function. Instead, the IQ mismatch and DCD error at TX output are minimized by sizing up the clock buffer to reduce the random portion of timing error and making the quarter-rate clock routing in layout as balanced as possible to decrease the systematic portion of timing error. The drawbacks are evident as increasing clock buffer size increases power consumption and introduces large supply IR drops. Also, balancing layout routing has limitations and is difficult to meet the tight EOJ specification for high-speed, e.g., 224 Gbps, link transceivers.

Some quarter-rate transmitter used asynchronous sampling clock calibration to calibrate IQ mismatch and DCD error. A high-speed asynchronous clock is used to sample each of the four quarter-rate clocks and count the number of 0s and 1s in the sampling results. The IQ mismatch and DCD error are derived using the count. However, this approach only detects the IQ mismatch and DCD error contributed by the quarter-rate clock but not errors contributed by the HSMUX's internal mismatch. Direct sampling the quarter-rate clocks adds more loading to the quarter-rate clock. Since the quarter-rate clock is high speed (e.g., 28 GHz for 224 Gbps transmitters), the additional loading increases power consumption and degrades clock quality. Additionally, this approach needs an asynchronous sampling clock that is much higher speed than the quarter-rate clock, introducing unwanted spurs at the transmitter output due to possible mixture between the clock signal and data signal in the high-speed section of the clock/data path.

In an embodiment of the present subject technology for calibrating clocks of high-speed transmitter, a foreground calibration method is proposed for addressing the IQ mismatch and DCD error directly related to quarter-rate clocks used for data transmission. For facilitating the clock calibration, the high-speed quarter-rate transmitter is programmed to transmit low-speed two-level data symbols with period of P UI, P can be any integer multiples of 4 (e.g., P=40), and have the data symbol transition (e.g., a rising edge) launched by one of the four quarter-rate clocks used by the same transmitter for regular data transmission. As shown in FIG. 2, one of the timing errors of the rising edges of the data symbols, i.e., one of $e_I$, $e_Q$, $e_{IB}$, $e_{QB}$, shows up at a transmitter (TX) output. Therefore, these data symbol waveforms at the TX output can be used to detect the IQ mismatch and DCD errors based on the timing errors based on Formulas (1) and (2).

Figure 3:
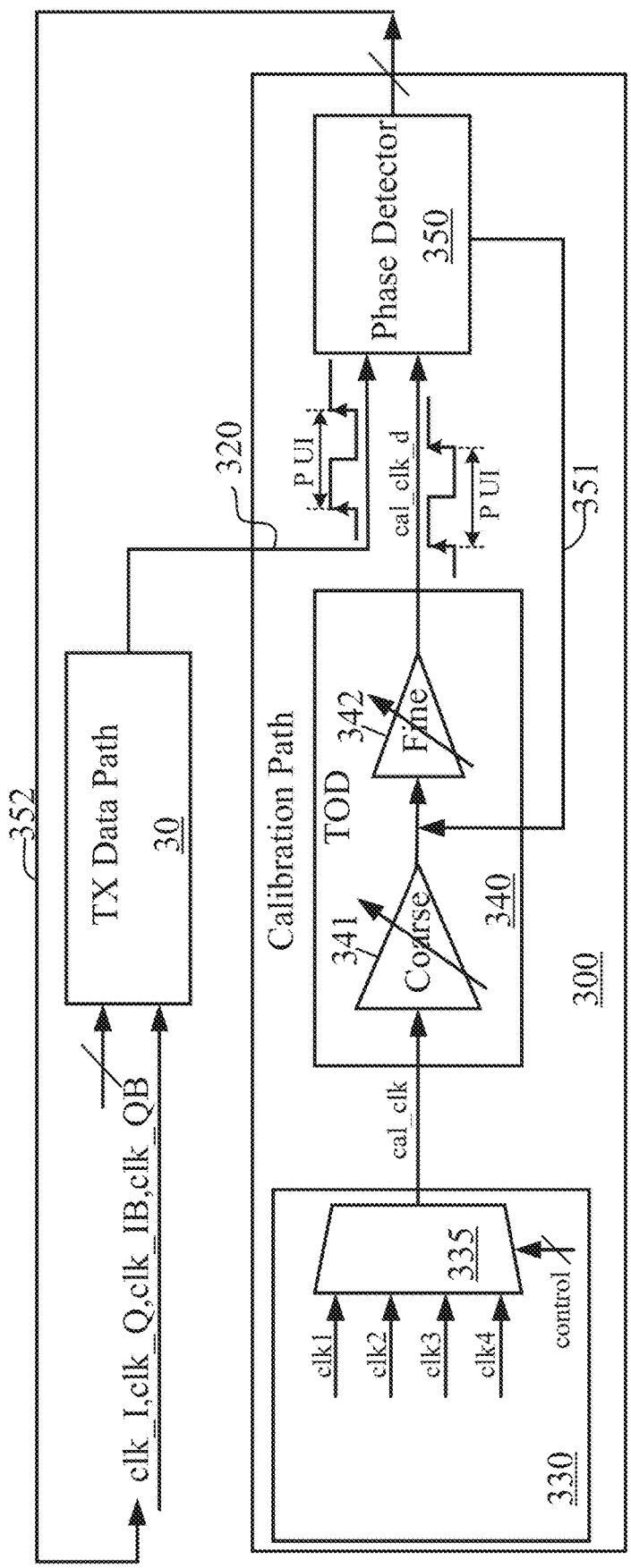
FIG. 3 is a simplified diagram of a clock calibration circuit with four internally generated calibration clocks at the transmitter output according to an embodiment of the subject technology.
Figure 3:
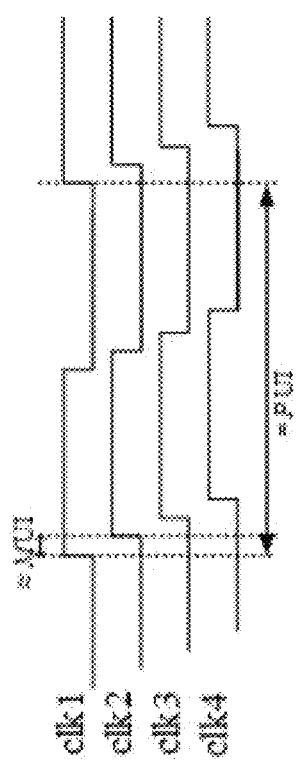

FIG. 3 is a simplified diagram of a clock calibration circuit 300 with four internally generated calibration clocks at the transmitter output according to an embodiment of the subject technology. In an embodiment, the clock calibration circuit 300 is disposed in a calibration data path next to the transmitted data path 30 to detect the IQ mismatch and DCD errors from the TX output. The clock calibration circuit 300 includes an input port 320 configured to receive the low-speed two-level P-UI periodic data symbol. The clock calibration circuit 300 uses a clock generator 330 to obtain four internally generated clocks, e.g., clk1, clk2, clk3, and clk4, and use a time-multiplexer 335 to select one of them as a calibration clock in each of a series of calibration operations. The clock calibration circuit 300 further includes a tunable on-chip delay (TOD) circuit 340 configured to perform a digitally controlled tuning process to adjust delays for the (selected) calibration clock. In an embodiment, the TOD circuit 340 comprises a coarse delay circuit 341 and a fine delay circuit 342 respectively using a coarse parameter and a fine parameter to define, measure, and adjust the delays during the tuning process. In a specific embodiment, the tuning process performed by TOD 340 involves using a coarse parameter and a fine parameter to adjust a waveform's rising edge triggered by the calibration clock based on a comparison with the rising edge of the two-level data symbol launched by one of the quarter-rate clocks. In fact, the tuning process is a feedback process based on a feedback signal 351 associated with the comparison aiming for an alignment of the two rising edges being compared. The clock calibration circuit 300 includes a phase detector 350 to perform the comparison and generate the feedback signal 351 based on a better alignment of the two rising edges. The feedback signal 351 then is fed back to the TOD circuit 340 to adjust the fine parameter in each feedback cycle. The phase detector 350 eventually determines a set of coarse parameter and fine parameters as the best alignment is determined. In the implementation of the proposed calibration scheme, the best alignment is considered to be reached when the measured IQ mismatch and DCD errors are smaller than predetermined values (in unit of fs).

Figure 5:
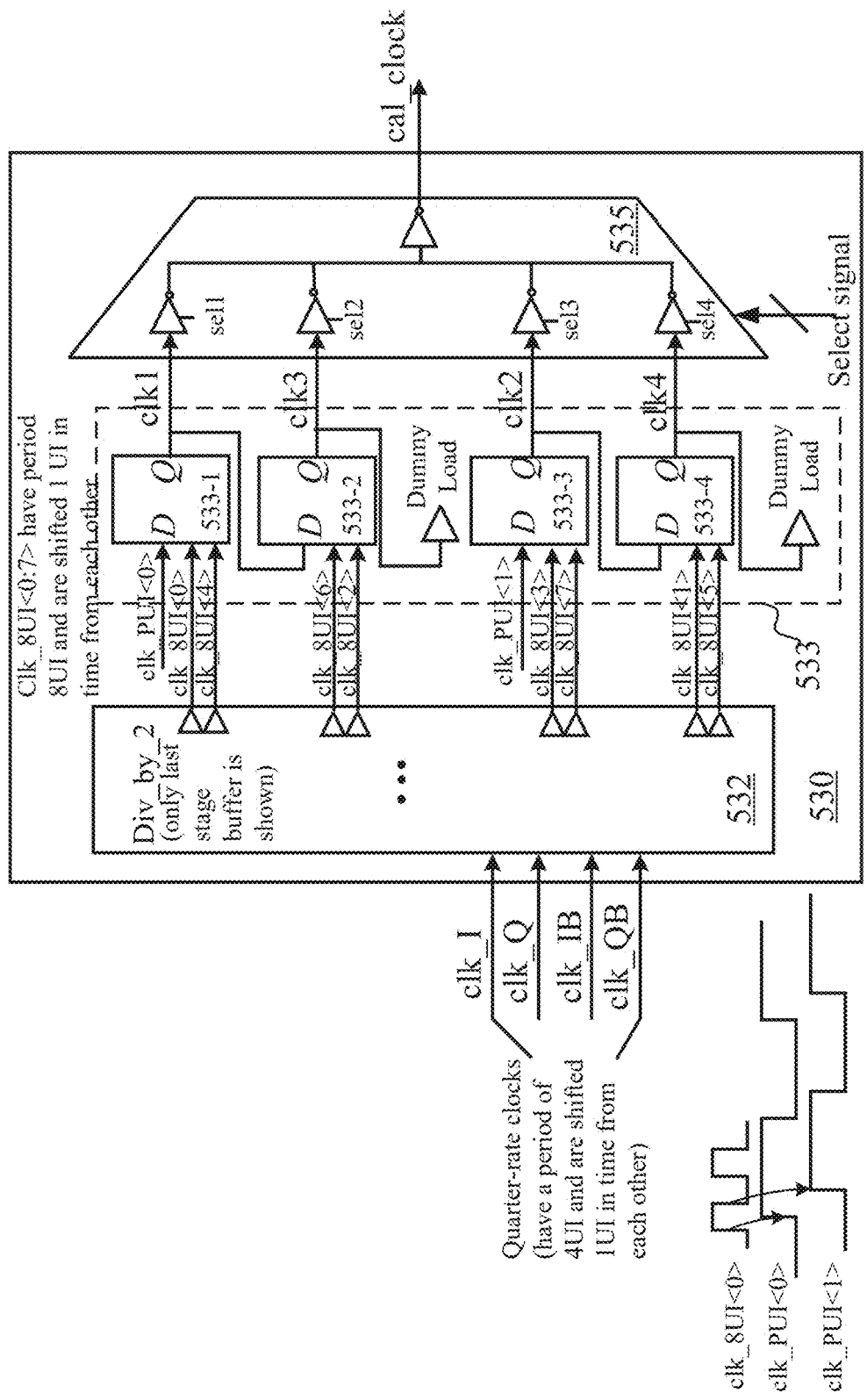
FIG. 5 is a simplified diagram of a clock generator in the clock calibration circuit according to an embodiment of the subject technology.

In an embodiment, the four clocks, clk1, clk2, clk3, clk4, are generated by the clock generator 330 fully internally based on the 4 quarter-rate clocks, clk_I, clk_Q, clk_IB, clk_QB, which have a period of 4 UI and are shifted 1 UI in time from each other. Each of the four clocks, clk1, clk2, clk3, or clk4, has a period P UIs, the same period of as the data symbol in transmitted data path, and is spaced apart sequentially by around M UIs as shown in FIG. 3, where M can be any integers that are 1 less than multiples of 4 (e.g., M∈3, 7, 11, . . . ). In other words, the second clock clk2 is M UI delayed relative to the first clock clk1. Similarly, the third clock clk3 is M UIs delayed relative to second clock clk2, and the fourth clk4 is M UIs delayed relative to the third clock clk3. The accuracy of the spacing M UIs is not important for the accuracy of clock calibration. For example, let M=3, the clock generator 330 can be implemented as a clock generator 530 as shown in FIG. 5. The clock generator 530 includes a divider (Div-by-2) block 532 configured to divide down the 4 quarter-rate clocks into 8 time-shifted 8-UI period clocks, clk_8UI<i> for i=0, 1, . . . , 7, where clk_8UI<i> is 1 UI delayed from clk_8UI<i−1> for each i.

The implementation of the Div-by-2 block 532 can be achieved using flip-flops (omitted in FIG. 5) and multi-stage buffers to covert the four quarter-rate clocks to the eight clocks, clk_8UI<0:7>. The output of the clk_8UI<0:7> can be arranged into 4 pairs of complementary clocks. A complementary clock in digital electronics refers to a pair of clock signals that are inverses of each other. Complementary clocks are a key component in differential signaling techniques, where signals are transmitted as pairs, with one being the inverse of the other. This approach is highly effective in minimizing noise and ensuring data integrity over long distances or in electrically noisy environments. For example, clk_8UI<0> and clk_8UI<4> are complementary, clk_8UI<1> and clk_8UI<5> are complementary, etc. As shown in FIG. 5, the clock generator 530 further includes a flip-flop block 533 coupled to the output of the Div-by-2 block 532. A flip-flop circuit is a fundamental building block in digital electronics, having a data input (D) and a clock input. The state of the D input, e.g., either an "1" or "0" is sampled during a clock pulse. The clock pulse (e.g., its rising edge) triggers the transfer to the output Q with a non-inverted state, e.g., either "1" or "0", with optional time delay. The flip-flop block 533 includes four differential flip-flop circuits, a first differential flip-flop circuit 533-1, a second differential flip-flop circuit 533-2, a third differential flip-flop circuit 533-3, and a fourth differential flip-flop circuit 533-4. The second differential flip-flop circuit 533-2 is coupled in series to the first differential flip-flop circuit 533-1 and serially followed by a first dummy load. The fourth differential flip-flop circuit 533-4 is coupled to the third differential flip-flop circuit 533-3 and serially followed by a second dummy load. At the same clock generator 530, two P-UI clocks clk_PUI<0> and clk_PUI<1> can be generated by dividing down clk_8UI<0> using its rising edge and falling edge respectively (as shown in FIG. 5). For example, if P=40, thus clk_PUI<0:1> can be obtained by dividing down by P/8=5 from clk_8UI<0>.

As shown in FIG. 5, each pair of the complementary clocks arranged from the eight clk_8UI<0:7> drives a differential flip-flop circuit. A first pair of complementary clocks clk_8UI<0> and clk_8UI<4> drives the first differential flip-flop circuit 533-1 to retime clk_PUI<0> to generate the first clock clk1. A third pair of complementary clocks clk_8UI<2> and clk_8UI<6> drives the second differential flip-flop circuit 533-2 to retime the first clock clk1 to generate the third clock clk3. A fourth pair of complementary clocks clk_8UI<3> and clk_8UI<7> drives the third differential flip-flop circuit 533-3 to retime clk_PUI<1> to generate the second clock clk2. A second pair of complementary clocks clk_8UI<1> and clk_8UI<5> drives the fourth differential flip-flop circuit 533-4 to retime the second clock clk2 to generate the fourth clock clk4. The first dummy load is added for clk3, and the second dummy load is added for clk4, to make it equal to the loads of clk1 and clk2 respectively. The layout placement of the differential flip-flops and arrangement of 4 different pairs of complementary clocks improve the accuracy of timing space among the four clocks, clk1, clk2, clk3, and clk4. Although such accuracy of timing space is not super critical as its effect can be cancelled out by the calibration (this feature will be illustrated throughout the calibration process in terms of adjustment and determination of the coarse parameters and fine parameters in the TOD circuit 340), too much inaccuracy may saturate calibration range.

Referring to FIG. 5, the clock generator 530 further includes a 4:1 time-multiplexer 535 comprising four front inverters sharing one output inverter. Each front inverter receives one of the four clocks, clk1, clk2, clk3, clk4, and time-multiplexes them to output or select (using the select signals sel1, sel2, sel3, sel4 to control the four inverters) one clock as a calibration clock. This front inverter, optionally, is made by a high-impedance inverter. Optionally, it is digitally controlled. The four front inverters are laid out identically to each other and are placed in a column from top to bottom, including two dummy loads, to have a balanced impedance matching and minimize the parasitic of the eight input clocks clk_8UI<0:7> as well as four output clocks clk1, clk2, clk3, clk4. This balanced architecture with repetitive pattern minimizes the skew introduced by layout parasitic. This calibration clock is used as an input for the TOD circuit 340 (see FIG. 3) for adjusting corresponding rising edge at least in some steps of the calibration process.

Referring to FIG. 3 again, the clock calibration circuit 300 further includes TOD circuit 340 to process the input calibration clock generated internally by the clock generator 330. TOD 340 includes a coarse TOD sub-circuit 341 and a fine TOD sub-circuit 342, each of them being a delay tuner configured to add adjustable time delay to the inputting calibration clock. The accuracy of calibration depends on the timing-adjustment step size and linearity configured in the corresponding delay tuner. For the coarse TOD sub-circuit 341, the corresponding timing adjustment architecture design is to provide a coarse adjustment (e.g., in terms of a coarse parameter) aiming for define or set a range of realizing alignment for clock calibration. After the coarse TOD sub-circuit 341, a fine TOD sub-circuit 342 is configured to provide a fine adjustment (in terms of one or more fine parameters) on the delays with multiple much smaller timing step size. For example, the timing step size can be 40 fs or smaller across the clock calibration process. In other words, the alignment accuracy should not exceed the minimum step size, e.g., 40 fs. When the alignment errors are reduced to 40 fs or smaller, the alignment of the two rising edges in comparison is considered to be realized.

Figure 6A:
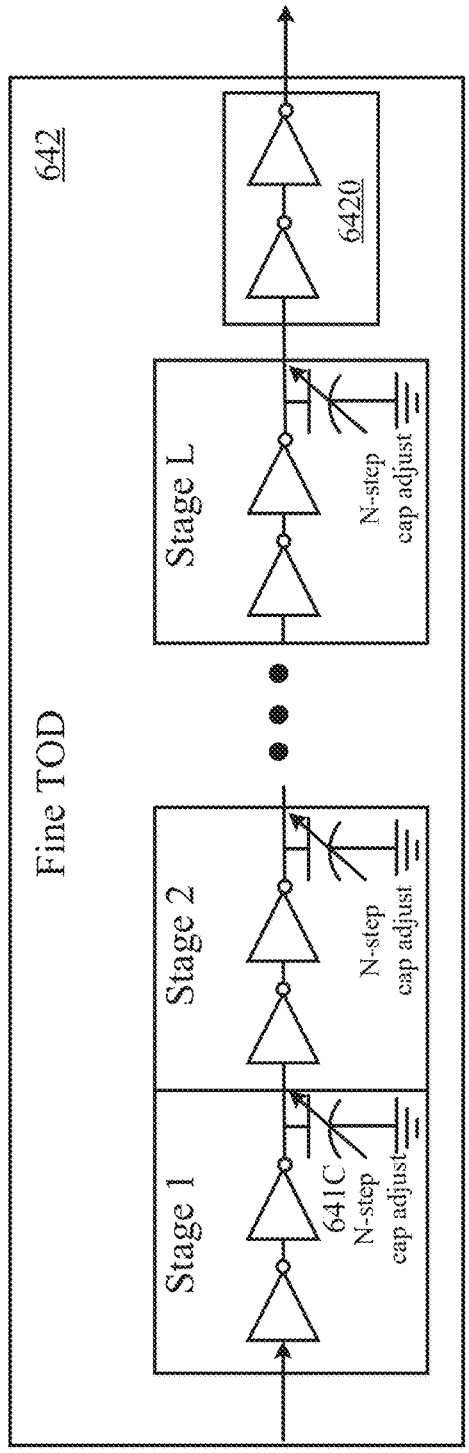
FIG. 6A is a simplified diagram of a tunable on-chip delay (TOD) circuit with L×N fine step adjustments according to an embodiment of the subject technology.

FIG. 6A shows an implementation of the fine TOD sub-circuit design with L×N fine step adjustments according to an embodiment of the subject technology. The fine TOD sub-circuit is divided into L identical delay-tuner stages, i.e., stage 1, stage 2, . . . , stage L, each stage contains a two-inverter buffer and an N-step tunable capacitor placed after the second inverter of each buffer stage. The L-stages delay tuner is followed by a two-inverter buffer 642. The tunable capacitor is configured with capacitance values adjustable in N linear steps. All the L stages delay tuner are combined together to realize total L×N step adjustment. The placement of the tunable capacitor at the output end of each buffer stage is to eliminate the step size variation that would otherwise come from the imbalance between the rise and fall delay of the inverters in the buffer stage.

Figure 6B:
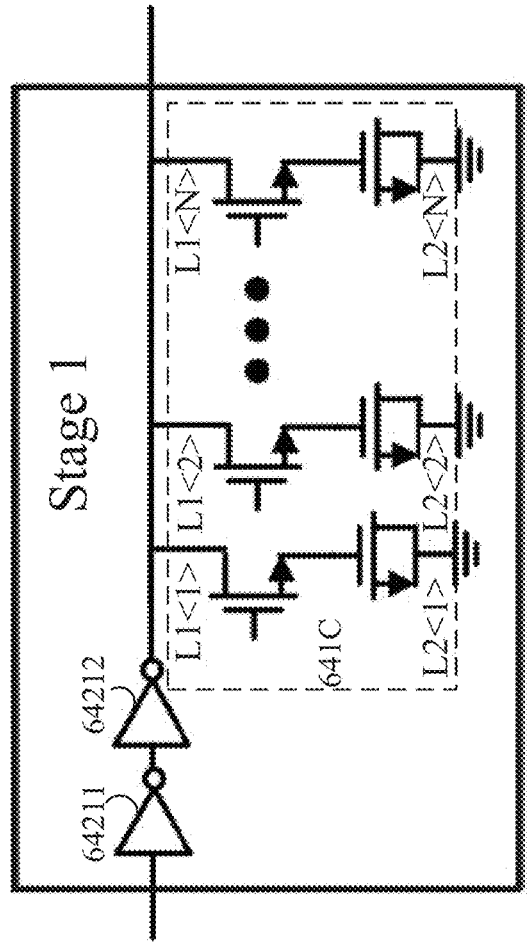
FIG. 6B is a simplified diagram of one of L-stages of the TOD circuit each with N identical tunable capacitors according to an embodiment of the subject technology.

FIG. 6B shows an implementation of the tunable capacitor 641C used in each of the L stages of delay tuner. As shown, the tunable capacitor 641C is placed in a shunt configuration after two inverters 64211 and 64212 that are coupled in a serial configuration. In an embodiment, the tunable capacitor 641C is formed with MOS capacitor (a MOS transistor with drain-source being shorted) connected to each buffer stage output through a MOS switch. Each stage's tunable capacitor includes N identical branches of NMOS switches, denoted as L1<1:N> and MOS capacitors, denoted as L2<1:N>. Each NMOS switch can be independently tuned on or off by applying VDD or VSS to its gate as control voltages. By digitally turning on 1, 2, . . . , or N of these NMOS switches L1<1:N>, the tunable capacitor 641C implements N-step tunable delay to the calibration clock processed by the TOD sub-circuit 342.

Referring to FIG. 3, the clock calibration circuit 300 is set up to perform a foreground clock calibration in a calibration data path to address IQ mismatch and DCD error due to the timing errors within the quarter-rate clocks according to an embodiment of the subject technology. The proposed clock calibration would produce beneficial solution for addressing EOJ and DJ specification for high-speed (>224 Gbps) serial-link transmitters in wireline communication channels. Based on the circuitry design of the clock calibration circuit 300, a calibration method can be provided as shown below. This calibration method includes multiple steps as depicted in a simplified diagram shown in FIG. 4. At step 1, the calibration method includes programming the transmitted data path to generate the P-UI periodic two-level data symbol and have its rising edge launched by the first quarter-rate clock clk_I, which is received by an input port 320 for the clock calibration circuit 300 in the calibration data path from the transmitted data path. The method then includes setting the calibration clock as the first clock clk1, which also has a P-UI periodic waveform as an input for the TOD circuit 340. The TOD circuit 340 processes the clk1 and output a cal_clock_d clock with adjusted delay. The method further includes comparing the rising edge of the cal_clock_d with the rising edge of data symbol from the input port 320 of the calibration circuit 300. This is executed by using a phase detector 350. The method additionally includes tuning the TOD circuit 340 by adjusting a coarse parameter (also named as a coarse TOD code) CTOD1 and a fine parameter (also called a fine TOD code) FTOD1 aiming to align the two rising edges in comparison in the phase detector 350. The coarse parameter CTOD1 corresponds to a large adjustment timing step. Its code is designed to be adjusted first for defining or measuring a range associated with a target alignment between the two rising edges in comparison by the phase detector 350. The fine TOD code FTOD1 is adjusted next to improve the alignment accuracy within the range set by the CTOD1. The adjustment of the fine parameter can be done using linear or binary search until both rising edges are aligned. As described earlier, the delay tuning is done in a feedback loop involving both the TOD circuit (or at least the fine TOD sub-circuit) for tuning time delay of the rising edge of clock waveform and the phase detector for comparing this rising edge with reference rising edge. When the fine TOD sub-circuit finds that the required adjustment is equal or smaller than the fine timing step size, the alignment is considered to be realized. Then, the feedback signal would indicate that the timing adjustment process can be ended. The coarse parameter CTOD1 and fine parameter FTOD1 are recorded in the end of the adjustment.

Figure 4:
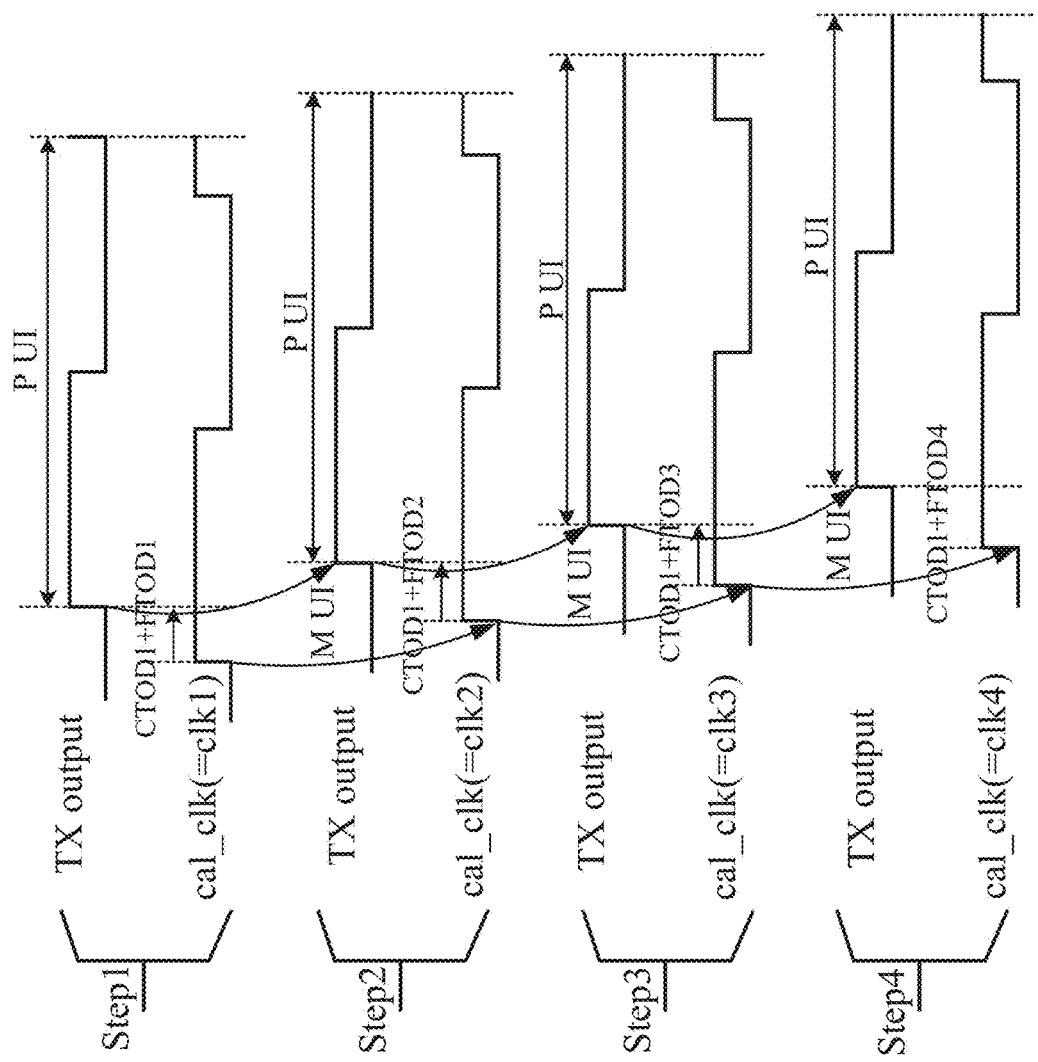
FIG. 4 is a schematic diagram for illustrating a method of clock calibration for quarter-rate transmitter according to an embodiment of the subject technology.

Referring to FIG. 4, at step 2, the calibration method includes operating the clock generator 330 to select a second clock clk2 (i.e., switch cal_clock from clk1 to clk2). The clk2 delays the cal-clock by around M UIs. At the same time, the transmitted data path is programmed to shift the data symbol by M UI without changing phase interval which causes the transmitted output rising edge to be launched by a different quarter-rate clock. For example, if in step 1 the data symbol is set to be launched by clk_I, then after shifting by M UIs and M is 1 less than multiples of 4, the data symbol will have to be launched by clk_QB. The method also includes keeping the coarse parameter CTOD1 unchanged for the TOD circuit 340 and only adjusting the fine parameter in the fine TOD sub-circuit 342 in the step 2 to re-align the rising edge of the cal_clock_d based on clk2 to that of data symbol with shifted M UIs delay. Then the method includes recording the fine parameter FTOD2 associated with the re-alignment.

Referring to FIG. 4 again, at step 3, the method further includes switching the calibration clock from clk2 to clk3 which again delays the (selected) calibration clock by around M UIs. The method then includes right shifting transmitted data symbol by M UIs without changing the phase interval, which causes the shifted rising edge to be launched by a different quarter-rate clock (e.g., clk_IB). The method further includes keeping the CTOD1 unchanged then adjusting the fine parameter to realign the rising edge of the cal_clock_d based on retimed clk3 to that of transmitted data symbol with another shifted M UIs delay. Then the method includes recording the fine parameter FTOD3 associated with the re-alignment.

Referring to FIG. 4, at step 4, the method furthermore includes switching the calibration clock from clk3 to clk4 which again delays the calibration clock by around M UIs. The method also includes right shifting the transmitted data symbol by M UIs without changing phase interval, which causes the shifted rising edge to be launched by another different quarter-rate clock, clk_Q. The method further includes keeping CTOD1 unchanged and adjusting only the fine parameter to realign the rising edge of the cal_clock_d based on retimed clk4 to that of transmitted data symbol with additional shifted M UIs delay. Then the method includes recording the fine parameter FTOD4 associated with the re-alignment.

At the end of step 4, five TOD codes are obtained: CTOD1 (a first coarse parameter) and FTOD1, FTOD2, FTOD3, FTOD4 ($1^{st}$ to $4^{th}$ fine parameters). Now the calibration method includes repeating step 1 to step 4 but starting the step 1 with the rising edge of transmitted data symbol launched by the second quarter-rate clock clk_Q. Performing the same method for the remaining steps to obtain another five TOD codes: CTOD5 (a second coarse parameter) and FTOD5, FTOD6, FTOD7, FTOD8 ($5^{th}$ to $8^{th}$ fine parameters).

Another operation of repeating step 1 to step 4 is performed. But this time, the method starts with the step 1 with the rising edge of transmitted data symbol launched by the third quarter-rate clock clk_IB. Then, the method includes performing the remaining steps to obtain another five TOD codes: CTOD9 (a third coarse parameter) and FTOD9, FTOD10, FTOD11, FTOD12 ($9^{th}$ to $12^{th}$ fine parameters).

In an embodiment, after the above (12-step) operations, the IO mismatch error and DCD errors of clocks can be computed from the 12 fine parameters from the TOD readout using the following formulas:

$(e_I - e_Q + e_{IB} - e_{QB})/2 =$ $(FTOD1 - FTOD2 + FTOD3 - FTOD4 + FTOD6 -$ $FTOD5 + FTOD8 - FTOD7)/4$

-continued $e_I - e_{IB} = (FTOD1 - FTOD3 + FTOD11 - FTOD9)/2$ $e_Q - e_{QB} = (FTOD4 - FTOD2 + FTOD10 - FTOD12)/2$ As shown in these formulas the calibration accuracy is determined by the accuracy of the fine TOD codes only. The accuracy of coarse TOD codes does not impact calibration accuracy. Since the fine parameters have small step size, it can be designed with good accuracy based on the rising edge alignment adjustments and associated measurements.

In an alternative embodiment, the DCD errors of clocks can be computed using only the $1^{st}$ to $8^{th}$ fine parameters based on alternative formulas:

$e_I - e_{IB} = (FTOD1 - FTOD3 + FTOD4 -$ $FTOD2 + FTOD7 - FTOD5 + FTOD6 - FTOD8)/2$ $e_Q - e_{QB} = (FTOD3 - FTOD1 +$ $FTOD4 - FTOD2 + FTOD5 - FTOD7 + FTOD6 - FTOD8)/2$

Comparing to the prior formulas, the alternative formulas have a drawback that it is more sensitive to the inaccuracy of fine parameters. But the advantage is that it requires only 8 steps of operation and measurement (e.g., performed without the last repeat of the 4-step operation), less than the 12 steps performed in prior embodiment.

Referring to FIG. 3, after the clock calibration circuit 300 finishes a cycle of calibration operation to obtain the IQ mismatch error and DCD errors of clocks, a second feedback signal 352 may be generated and feedback to the transmitted data path to correct the quarter-rate clocks based on the IQ mismatch and DCD errors. In general, as the corrected quarter-rate clock is introduced, a new cycle of calibration can be initiated again to determine the IQ mismatch and DCD errors in this new cycle. This can be continued through many iterations until the calibration results of the clocks is satisfied. Then, the calibrated quarter-rate clocks will be used for transmitting regular data through the serial-link data path. Optionally, the calibration operation using the clock calibration circuit 300 can be executed any time if necessary.

Figure 7:
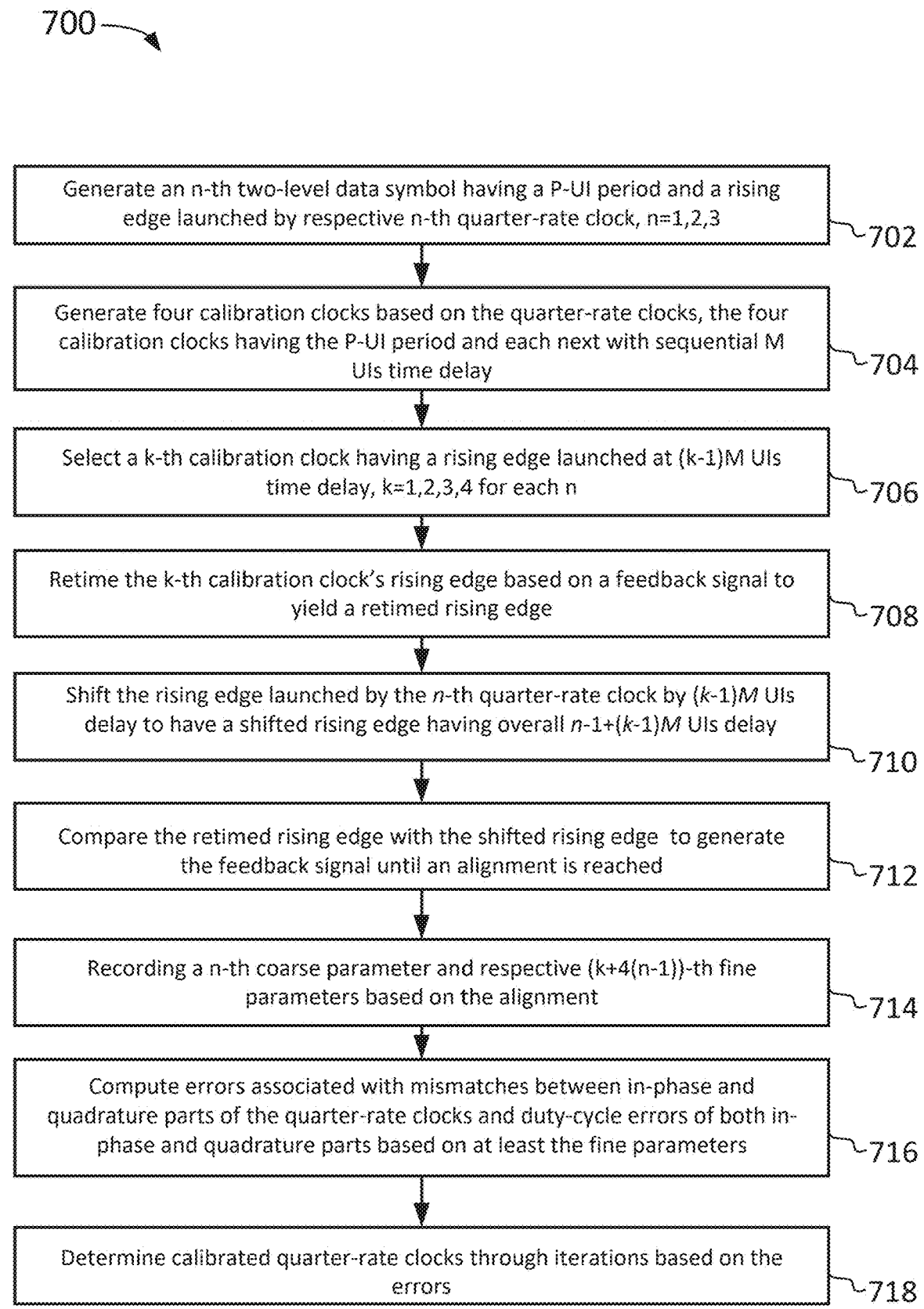
FIG. 7 is a flow chart illustrating a method for clock calibration for quarter-rate transmitter according to an embodiment of the subject technology.

FIG. 7 is a flow chart illustrating a method 700 for calibrating clocks in high-speed serial-link transmitter according to an embodiment of the subject technology. In an embodiment, the method 700 is executed based on the circuitry architecture of clock calibration circuit 300 (FIG. 3) set at the side of the high-speed transmitter output and based on the guidance from application of the 4-step calibration operation illustrated in FIG. 4. As shown in FIG. 7, the method 700 includes a step 702 for generating an n-th two-level data symbol having a period of P unit intervals (UIs) in a transmitted data path associated with the quarter-rate transmitter. The two-level data symbol has a rising edge launched by the n-th quarter-rate clock used for data transmission, where P is an integer multiple of 4 and n is sequentially selected from 1, 2, and 3 referring to three repeats of the 4-step calibration operation shown in FIG. 4.

Referring to FIG. 7, the method 700 includes a step 704 for generating four calibration clocks in a calibration path based on the four quarter-rate clocks. In other words, the calibration clocks are generated internally in a clock generator 330 of the clock calibration circuit 300 in the calibration path (see FIG. 3). Each of the four calibration clocks has the period of P UIs, the same as the two-level data symbol in the transmitted data path. The four calibration clocks have a sequential relative delay of M UIs, where M is one less than an integer multiple of 4.

At step 706 of FIG. 7, the method 700 includes selecting a k-th calibration clock from the four calibration clocks, the k-th calibration clock having a rising edge launched at (k−1)M UIs delay, wherein k is consecutively selected from 1, 2, 3, and 4 for each n (1, 2, 3). This summarizes each of the four steps performed in each repeat. In particular, the calibration rising edge will be shifted M UIs in each subsequent step. For example, in the first step, the rising edge has no shift; in the second step, the rising edge will be shifted by M UIs, and so on. This rising edge shift is related to direct switch the calibration clock from clk1 to clk2, or from clk2 to clk3, or from clk3 to clk4.

Further at step 708, the method 700 includes retiming the rising edge of the calibration clock based on a feedback signal to yield a retimed rising edge. This process involves utilizing the TOD circuit 340 for adjusting the position of the calibration rising edge by directly applying time delay through both a coarse delay tuner and a fine delay tuner. The delay tuning is based on a feedback signal received from a phase detector 350 which in fact uses an output cal-clock_d (with a retimed rising edge) of the TOD circuit 340 to compare with the rising edge of the transmitted data symbol. The goal of the phase detector 350 to compare the two rising edges is to drive an alignment between them which leads to clock calibration.

At step 710, the method 700 includes shifting the rising edge of the transmitted two-level data symbol launched by the n-th quarter-rate clock by (k−1)M UIs delay to have a shifted rising edge at n−1+(k−1)M UIs delay. This summarizes the performance of each of the four steps in each of the three repeats of the calibration operation. For example, for n=1, k=1 in step 1 of FIG. 4, the rising edge has no shift. But for k=2 in step 2 of FIG. 4, the rising edge will be shifted by M UIs, launched by a different quarter-rate clock. For a first repeat n=2, in the step 1 of FIG. 4, the rising edge is shifted by 1 UI launched by next quarter-rate clock. In the step 2 of FIG. 4, the rising edge will be shifted by another M UIs. The shifting operation of the two-level data symbol is executed in the transmitted data path 30 of FIG. 3 from which the two-level data symbol is originally generated.

At step 712, the method 700 further includes comparing the retimed rising edge with the shifted rising edge to generate the feedback signal until an alignment between the corresponding two rising edges is reached. This step is performed by the phase detector 350 which is configured to compare the rising edges or two input waveforms. Here, one rising edge is the retimed rising edge from the calibration clock output from the TOD circuit 340 in the calibration path and another rising edge is the shifted rising edge of the two-level data symbol from the transmitted data path. The phase detector is configured to determine that the alignment between the two rising edges is not yet reached to obtain the feedback signal and send it back to the TOD circuit (particularly to the fine TOD sub-circuit) in a feedback loop to drive further timing adjustment or retime the rising edge further until the alignment is finally reached. The alignment is determined to be realized when the fine timing adjustment has reached its smallest step size.

At step 714, the method 700 includes recording an n-th coarse parameter and respective (k+4(n−1))-th fine parameters associated with retiming the calibration rising edge based on the alignment between the two rising edges being compared in the phase detector. The coarse parameter comes from tuning a coarse TOD sub-circuit to make a first adjustment with a rough and big timing step size, which effectively define a range that an alignment should be achieved. The fine parameter comes from tuning a fine TOD sub-circuit (see FIG. 6B), which can be implemented with a L-stages inverter buffers each followed by a tunable capacitor to provide N linear timing steps. Each step can be very small, e.g., 40 fs, to make the delay tuning with very good accuracy. When the smallest step is used, the timing adjustment can be ended.

In the end, as the alignment is reached, the corresponding coarse parameter and fine parameter will be determined and recorded. In fact, after executing the method designed for n=1, 2, 3 and k=1, 2, 3, 4, three coarse parameters and 12 fine parameters will be obtained and used to compute the IQ mismatch and DCD errors of clocks using a formula described in earlier sections of this application. At step 716, the method 700 includes computing errors associated with mismatches between in-phase and quadrature parts of quarter-rate clocks and duty-cycle errors of both in-phase part and quadrature part based on at least the fine parameters determined in step 714. The obtained IQ mismatch and DCD errors further are used in another feedback loop for correcting the clocks used in the transmitted data path to complete a clock calibration process (i.e., step 718) for the high-speed (>224 Gbps) transmitters in serial-link communication channel. In an alternative embodiment, executing the method can be done for n=1, 2 and k=1, 2, 3, 4, resulting in 2 coarse parameters and 8 fine parameters which will be used to compute the IQ mismatch and DCD errors using an alternative formula described earlier. Regardless of which formula, the calibration accuracy is not affected even if the four internally generated clocks (clk1, clk2, clk3, clk4) used for calibration have skews that cause them to be not exactly spaced by M UIs apart, the impacts of these skews are cancelled by the minus sign in the formula for computing the IQ and DCD errors. The calibration is also immune to the offset of phase detector used in the calibration circuit. Once the IQ mismatch and DCD error are detected, the detection results are used for clock error correction. The error correction can be implemented by adjusting the cap loading, the bias current, or the reference voltage in the clock buffer (not shown in this application). After the first correction is done, a few more iterations of detection and correction can further improve the calibration accuracy.

Figure 8A:
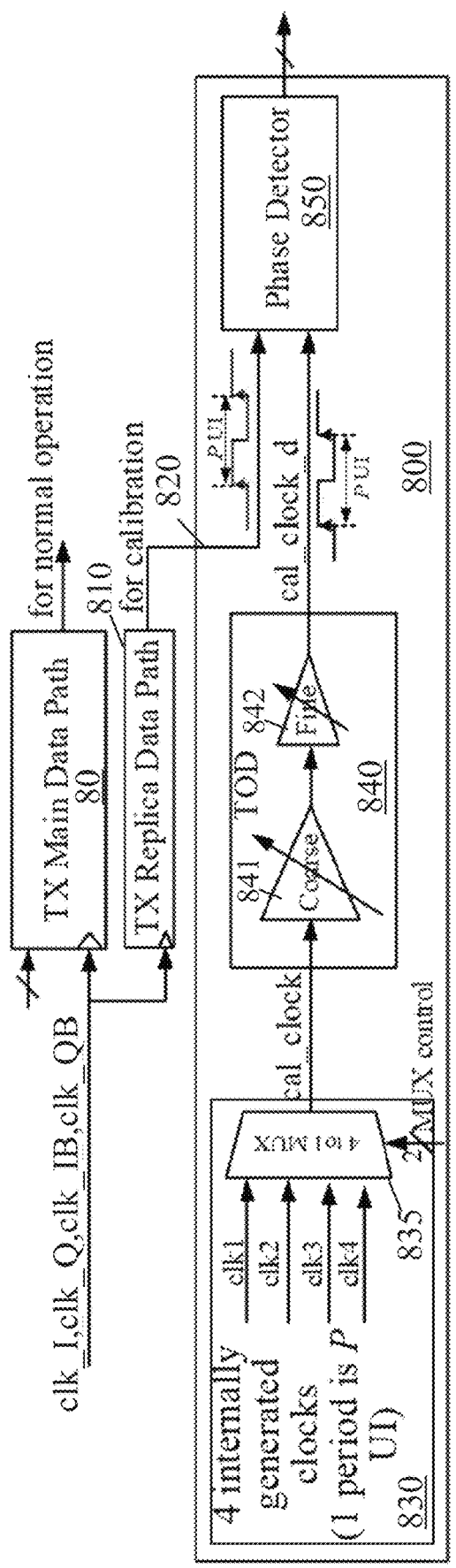
FIG. 8A is a simplified diagram of a clock calibration circuit for background calibration according to an embodiment of the subject technology.

In an alternative embodiment, a background calibration method for calibrate the drifts of IQ mismatch and DCD error is provided. These drifts are mostly contributed by non-ideal clocks in transmitted data path. The background calibration can be performed during transmitter in normal operation to correct those drifts. FIG. 8A is a simplified diagram of a clock calibration circuit for background calibration according to an embodiment of the subject technology. In an embodiment, the background calibration is based on the same principle of the proposed foreground calibration (see FIG. 3 and FIG. 7), except that a replica data path is introduced to measure the IQ mismatch and DCD errors such that the normal operation of the data transmission is not interrupted. As shown in FIG. 8A, a replica data path 810 is disposed next to and with a tap attached to the transmitted data path 80. The replica data path 810 is configured to generate the P-UI periodic two-level data symbol used for calibration. The IQ mismatch and DCD errors are measured from the output of the replica data path which is directly coupled to input port 820 of a clock calibration circuit 800.

The clock calibration circuit 800 uses a clock generator 830 to generate four internally generated clocks, e.g., clk1, clk2, clk3, and clk4, and use a time-multiplexer 835 to select one of them as a calibration clock in each of a series of calibration operations. The clock calibration circuit 800 further includes a tunable on-chip delay (TOD) circuit 840 configured to perform a digitally controlled tuning process to adjust delays for the (selected) calibration clock. In an embodiment, the TOD circuit 840 comprises a coarse delay circuit 841 and a fine delay circuit 842 respectively using a coarse parameter and a fine parameter to define, measure, and adjust the delays during the tuning process. In a specific embodiment, the tuning process performed by TOD 840 involves using a coarse parameter and a fine parameter to adjust a waveform rising edge triggered by the calibration clock based on a comparison with a rising edge of the two-level data symbol launched by one of the quarter-rate clocks. The clock calibration circuit 800 includes a phase detector 850 to perform the comparison of phases associated with the two rising edges and generate the feedback signal based on a better alignment of the two rising edges. The feedback signal then is fed back to the TOD circuit 840 to adjust the fine parameter in each feedback cycle. The calibration circuit 800 is in principle the same as the calibration circuit 300 of FIG. 3.

Figure 8B:
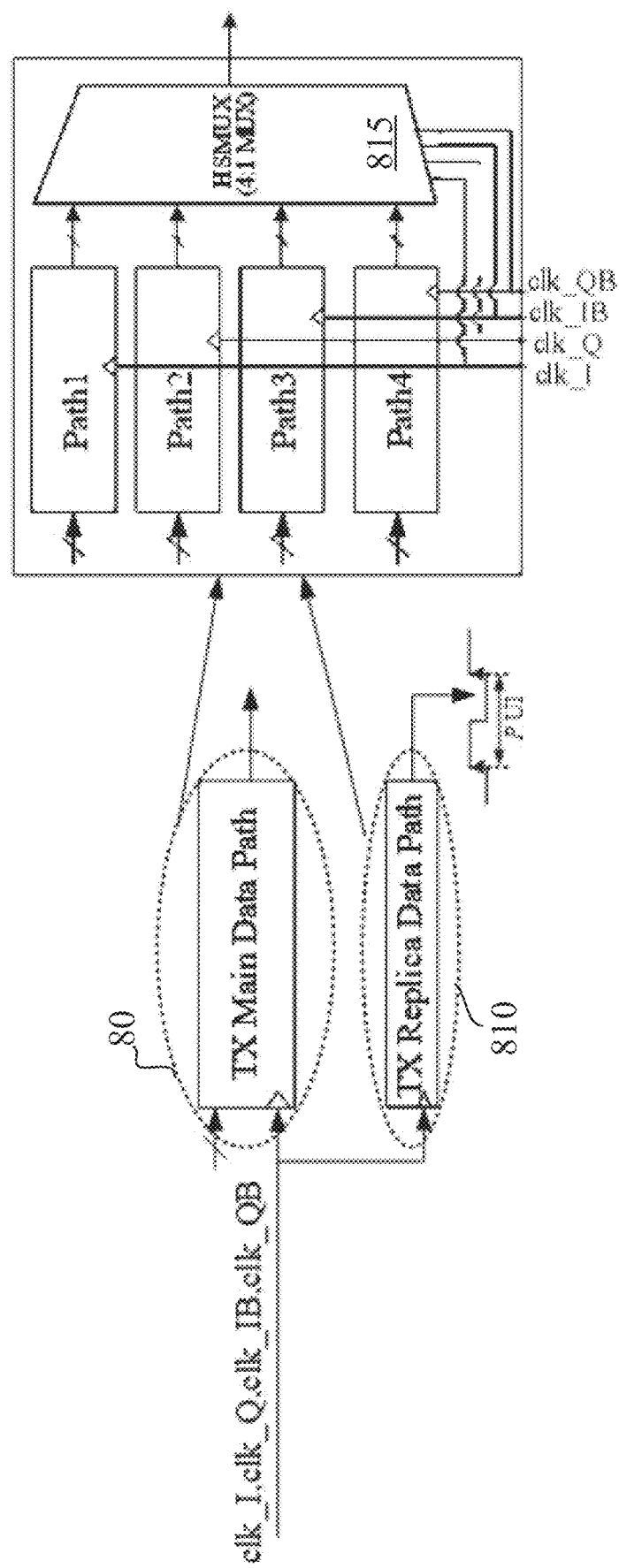
FIG. 8B is a simplified diagram illustrating a replica data path like the transmitted data path both comprising four quarter-rate paths combined by a 4:1 high-speed time-multiplexer according to an embodiment of the subject technology.

FIG. 8B is a simplified diagram illustrating a replica data path 810 like the transmitted data path both comprising four quarter-rate paths combined by a 4:1 high-speed time-multiplexer (HSMUX) according to an embodiment of the subject technology. As shown, the replica data path 810 is configured similar to main transmitted data path 80, including four quarter-rate paths, Path1, Path2, Path3, Path4, and HSMUX 815 for combining the 4 paths into one to output data symbols from different paths at different time delays. The replica data path 810 is launched by the same quarter-rate clocks (clk_I, clk_Q, clk_IB, clk_QB) as the transmitted data path 80 (see FIG. 1). Thus, the output timing error contributed by the non-idealities of the quarter-rate clocks are the same between the two data paths. The replica data path 810 optionally can be made much smaller in size than the main data path by launching only a single-bit P-UI periodic data symbol that consumes lower power instead of multi-bit P-UI periodic data symbol in the main data path. If conventional structure of HSMUX is used in the replica data path, due to the smaller size of HSMUX within the replica data path, the drift of replica data path output timing errors contributed by the drift of HSMUX mismatch, which is mainly resulted from the temperature or voltage drifts, is much larger than that by the main data path. Therefore, the proposed background calibration using the proposed structure replica HSMUX (see FIG. 9 below) in the replica data path to generate the (single-bit) P-UI periodic data symbol would provide a more sensible and accurate measurement on calibrating timing errors related to those drifts.

Figure 9:
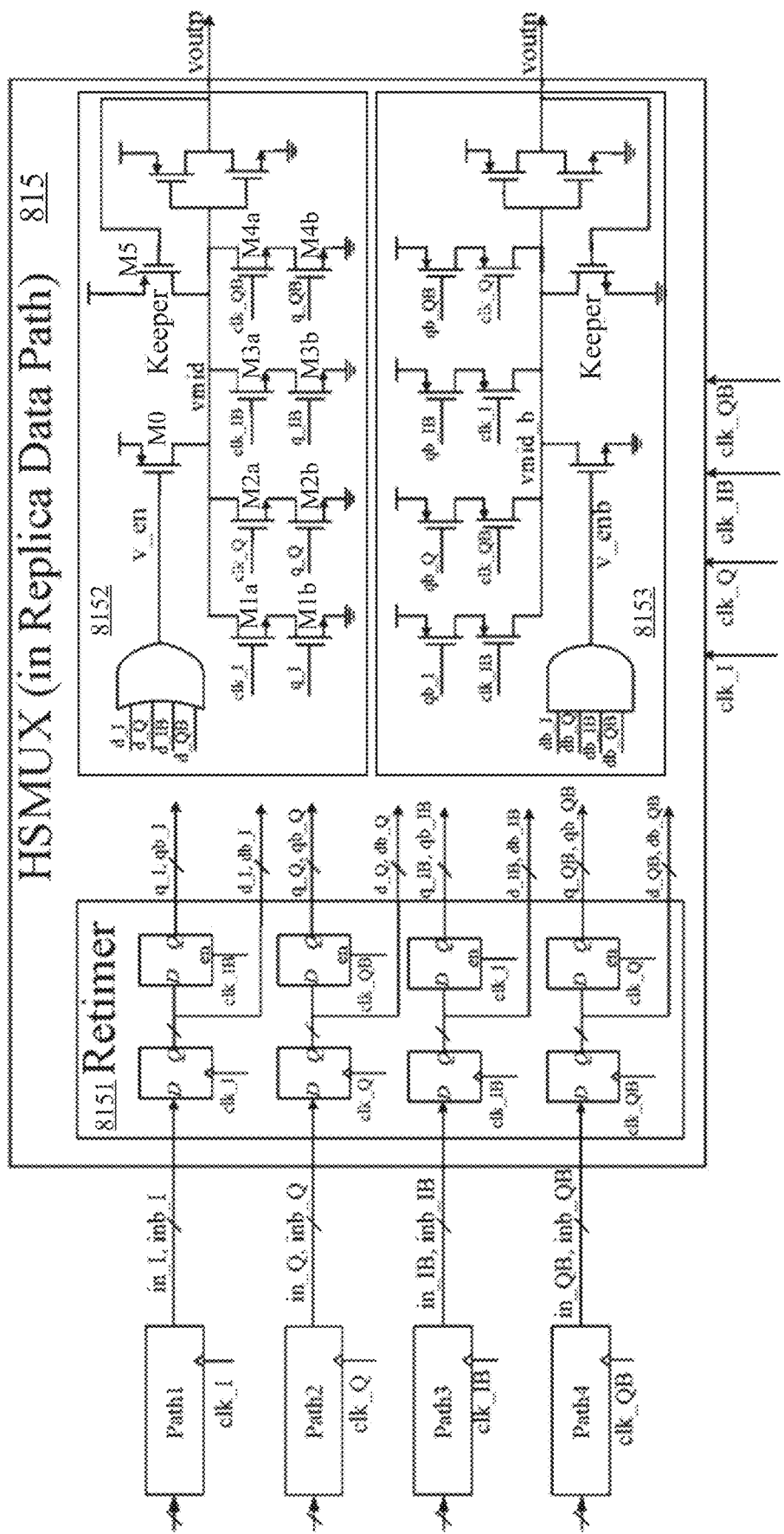
FIG. 9 is a simplified diagram illustrating an implementation of high-speed time-multiplexer in the replica data path according to an embodiment of the subject technology.

FIG. 9 is a simplified diagram illustrating a circuitry structure of HSMUX 815 of FIG. 8B in the replica data path receiving 4 sets of complementary data inputs respectively from four quarter-rate paths to generate two complementary outputs to make a single-bit two-level differential data symbol according to an embodiment of the subject technology. The HSMUX 815 is configured to receive 4 sets of complementary data inputs, each from one of the 4 quarter-rate paths. Path1 provides a first set of complementary data inputs: in_I and inb_I, inb_I being inverted from in_I. Path2 provides in_Q and inb_Q. Path3 provides in_IB and inb_IB. Path4 provides in_QB and inb_QB. The HSMUX 815 is configured to retime them internally with 4 quarter-rate clocks, and then mux the data to generate a pair of complementary outputs, voutp and voutn, where voutn is inverted relative to voutp. The HSMUX 815 can be configured to have a rising edge of a differential output, (voutp−voutn), launched by any chosen quarter-rate clocks among clk_I, clk_Q, clk_IB, clk_QB. The differential output is an alternative expression of the two-level data symbol which carries the time error of that quarter-rate clock for calibration in the clock calibration circuit. The falling edge of the differential output (voutp−voutn) is not used for calibration.

As shown in FIG. 9, the HSMUX 815 is implemented with three major components, a retimer circuit 8151, a first logic selector circuit 8152, and a second logic selector circuit 8153. The retimer 8151 receives the 4 sets of complementary data inputs. Among each set of complementary data inputs, these four data inputs, in_I/in_Q/in_IB/in_QB, are periodic square waveforms with the same period of P UI and are consecutively shifted by 1 UI. So are the four inverted data inputs, inb_I/inb_Q/inb_IB/inb_QB. They are generated by a low-speed MUX or mid-speed MUX (not shown) located preceding the HSMUX 815. An implementation of this LSMUX or MSMUX is a P-to-4 MUX configured to time-multiplex P groups of input data, D<1:P> into 4 output data, in_I/in_Q/in_IB/in_QB. Further, another 4 inverted output data, inb_I/inb_Q/inb_IB/inb_QB, can be generated, and paired with in_I/in_Q/in_IB/in_QB respectively to form the 4 pairs of complementary data inputs in the four quarter-rate paths. In the replica data path, the data input D<1:P> is static and no change from one cycle to another. By programming the D<1:P>, the four data inputs, in_I/in_Q/in_IB/in_QB, can be chosen to have its rising edge launched by respective one of the 4 quarter-rate clocks. For example, if D<1:K> is set to 1 and the rest P-K bits of D is set to 0, where K is any integer multiples of 4 and K<P, then the timing of rising edge of in_I may come first, followed by that of in_Q, in_IB, and in_QB, each delayed consecutively by 1 UI. This order would ensure that the differential output (voutp−voutn) of the replica HSMUX 815 has its rising edge being launched by the first quarter-rate clock clk_I. Alternatively, if D<2:K+1> is set to 1 and the rest P-K bits is set to 0, the rising edge of in_Q would comes first, followed by that of in_IB, in_QB, and in_I. Then, the differential output of HSMUX 815 will be launched by clk_Q.

Referring to FIG. 9, the retimer 8151 is formed by 4 sets of flip-flop and latch circuits. The retimer 8251 receives the four pairs of complementary data inputs from respective four quarter-rate paths. A flip-flop circuit first receives the data inputs from each path, then the output of the flip-flop being used both as a first output and the input of a latch circuit to generate a second output. The first output is a non-inverted input with retimed delay. The second output also has a retimed delay triggered by an enable signal. A latch is a bistable device, meaning it has two stable states. These states correspond to the binary values 0 and 1, or 'low' and 'high' in voltage terms. Once the latch is set to one of these states, it will remain there until it receives a signal to switch to the other state. When the enable signal is active, the latch captures and holds the state of the data input. The retimer 8151 retimes 4 data inputs in_I/in_Q/in_IB/in_QB with four quarter-rate clocks clk_I/clk_Q/clk_IB/clk_QB to generate two groups of internal data d_I/d_Q/d_IB/d_QB and q_I/q_Q/q_IB/q_QB, which are then used by the first logic selector 8152 for the generation of the first output voutp. For example, when a first flip-flop circuit of the retimer 8151 receives a first pair of complementary data, e.g., in_I and inb_I, it retimes them with a rising edge of the quarter-rate clock clk_I to yield a second pair of data, d_I and db_I. The second pair of data, d_I and db_I, is inputted to a first latch circuit coupled to the first flip-flop circuit, which further retimes them with the falling edge of the quarter-rate clock clk_I to generate a third pair of data, q_I and qb_I. This applies to each of the four pairs of complementary data inputs from respective four quarter-rate paths being respectively retimed by the 4 sets of flip-flop and latch circuits. Similarly, the retimer 8151 retimes 4 inverted data inputs inb_I/inb_Q/inb_IB/inb_QB with four quarter-rate clocks clk_I/clk_Q/clk_IB/clk_QB, which are then used by the second logic selector circuit 8153 for the generation of the second output voutn. The circuitry setup and corresponding logic operations for the second logic selector 8153 for voutn generation are exactly inverted from those implemented in the first logic selector circuit 8152 for voutp generation. Only the timing relationship of logic data for voutp generation is described in detail below.

Figure 10:
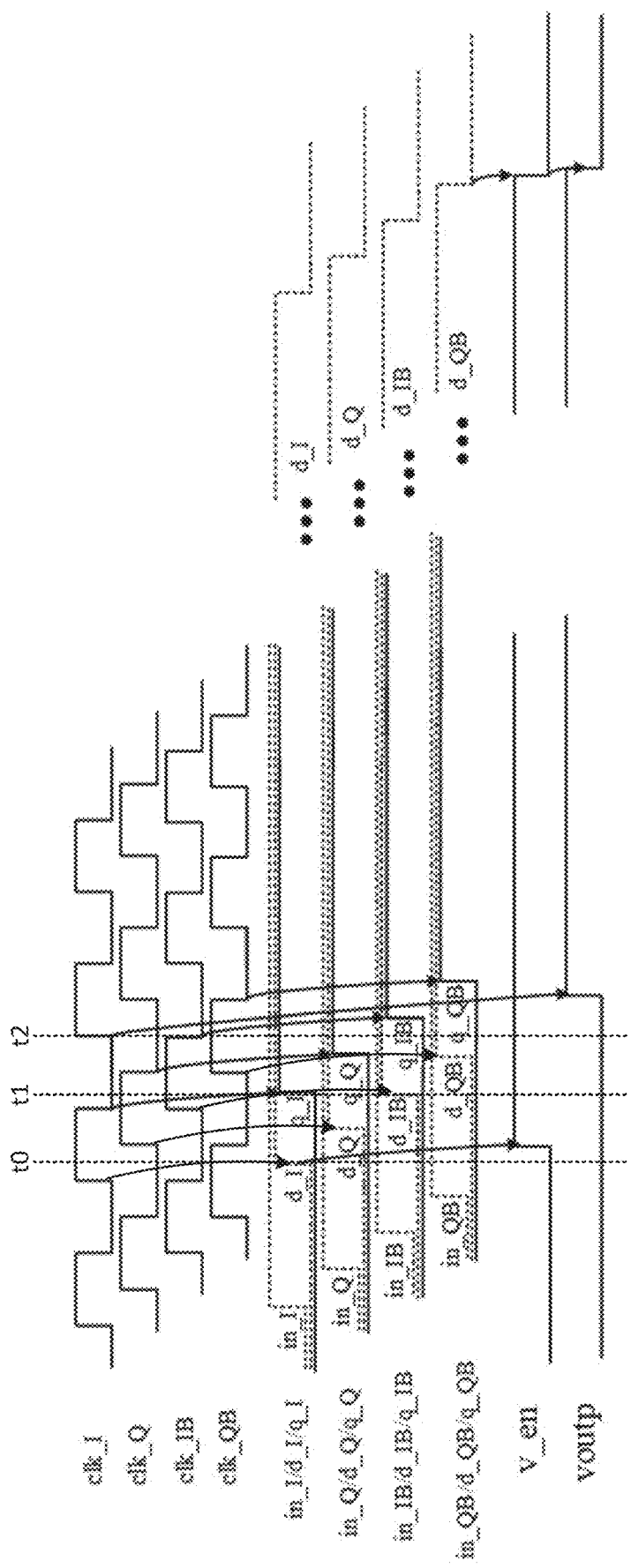
FIG. 10 is a timing diagram illustrating one of the two complementary outputs being generated by the 4:1 high-speed time-multiplexer in the replica data path according to an embodiment of the subject technology.

Referring to FIG. 10, which is a timing diagram illustrating one of the two complementary outputs being generated by the 4:1 high-speed time-multiplexer in the replica data path according to an embodiment of the subject technology. In an embodiment, assuming that data input in_I comes first in time, the retimer 8151 has a corresponding inputs/outputs timing relationship shown in FIG. 10. As shown, four internal data d_I/d_Q/d_IB/d_QB are generated by retiming the four data inputs in_/in_Q/in_IB/in_QB by the rising edge of quarter-rate clock clk_I, clk_Q, clk_IB, clk_QB, respectively. Thus, they are consecutively time shifted by 1 UI. Additionally, another four internal data q_I/q_Q/q_IB/q_QB is generated by retiming d_I/d_Q/d_IB/d_QB by the subsequent falling edge of clk_I, clk_Q, clk_IB, clk_QB, respectively. Thus, they are also consecutively shifted by 1 UI. As a group, the second group q_I/q_Q/q_IB/q_QB are shifted by 2 UI from the first group d_I/d_Q/d_IB/d_QB.

Referring FIG. 9, considering the first logic circuit 8152 and its operation based on the timing diagram shown in FIG. 10, the generation of the first HSMUX output voutp is followed through these following steps. At step 1, prior to the rising edge t0 of the internal data d_I, all internal data d_I/d_Q/d_IB/d_QB and q_I/q_Q/q_IB/q_QB are 0. Thus, the bottom NMOS transistors M1b/M2b/M3b/M4b are all turned off while the top PMOS transistors M0 is turned on since the 4-1 OR gate output v_en=0. Therefore, voltage level of vmid is pulled up to 1, resulting in voutp=0. At step 2, right after the rising edge of d_I but prior to the rising edge of q_I, i.e., in the interval between time "t0" and "t1", the 4-1 OR gate output v_en=1, and all data q_I/q_Q/q_IB/q_QB are 0. So, both PMOS M0 and all NMOS M1b/M2b/M3b/M4b are turned off. However, given a small PMOS Keeper transistor M5, vmid stays at 1 and the output voutp stays at 0. At step 3, the rising edge t1 of another internal data q_I turns on NMOS transistor M1b. The subsequent rising edge t2 of quarter-rate clock clk_I turns on NMOS transistor M1a as well. This ON branch is formed by NMOS transistors M1a and M1b pulls vmid down to 0, resulting in voutp=1. This completes the generation of rising edge of the first HSMUX output voutp. The falling edge of voutp occurs after all of d_I/d_Q/d_IB/d_QB and q_I/q_Q/q_IB/q_QB returns to 0. Since the falling edge of voutp is not used for calibration, this is not matter much.

The generation of voutn will be performed in the second logic selector circuit 8153, which is essentially an inverted version of the first logic selector circuit 8152. For example, the top PMOS transistor in the first logic circuit 8152 is replaced by a bottom NMOS transistor in the second logic selector circuit 8153. The PMOS Keeper transistor in the first logic circuit 8152 is replaced by a NMOS Keeper transistor in the second logic selector circuit 8153. The 4-1 OR gate in the first logic circuit 8152 is replaced by 4-1 AND gate in the second logic selector circuit 8153. In the example described above, the generations of voutn and voutp are all using the same clock edges, e.g., clk_I. So voutp and voutn are complementary but their transitions happen at the same time.

As shown in FIG. 10, the rising edge of voutp, i.e., the positive output of the HSMUX in the replica data path, is triggered by the rising edge of the quarter-rate clock clk_I. Since there are very few stages between clk_I and voutp, it has very small inherent mismatch and mismatch drift. On the other hand, the falling edge of voutp is triggered by the falling edge of the retimed data d_QB, which are subjected to more latency and mismatch. However, the proposed clock calibration only observes the rising edge of voutp, this mismatch does not matter for the calibration accuracy.

The proposed foreground and background clock calibrations described throughout the specification calibrate out the clock IQ mismatch error and DCD error for high-speed transmitters. These calibrations are necessary to comply with the stringent EOJ and DJ specifications and guarantee system performance especially for serial link communication channel with data rate as high as 200 Gbps or higher. The disclosed calibration method provides many advantages over traditional techniques. The calibration operation can be self-contained. No need for any external clock sources. The calibration clocks are internally generated by dividing the quarter-rate clocks already available inside the transmitter. This saves chip area and reduces layout floorplan complexity. In some embodiments, the proposed calibration is insensitive to calibration clock non-idealities. The deterministic skew among the internally generated clocks clk1, clk2, clk3, clk4 used for deriving calibration clocks does not affect calibration accuracy. The random jitter of the calibration clocks can be well controlled by design due to its localization. Additionally, the proposed calibration can be performed both foreground and background. By detecting IQ mismatch and DCD errors from the transmitter output, the calibration method can capture the timing error contribution not only from the non-ideal quarter-rate clocks but also from mismatch within the HSMUX due to temperature or voltage drift.

Figure 11:
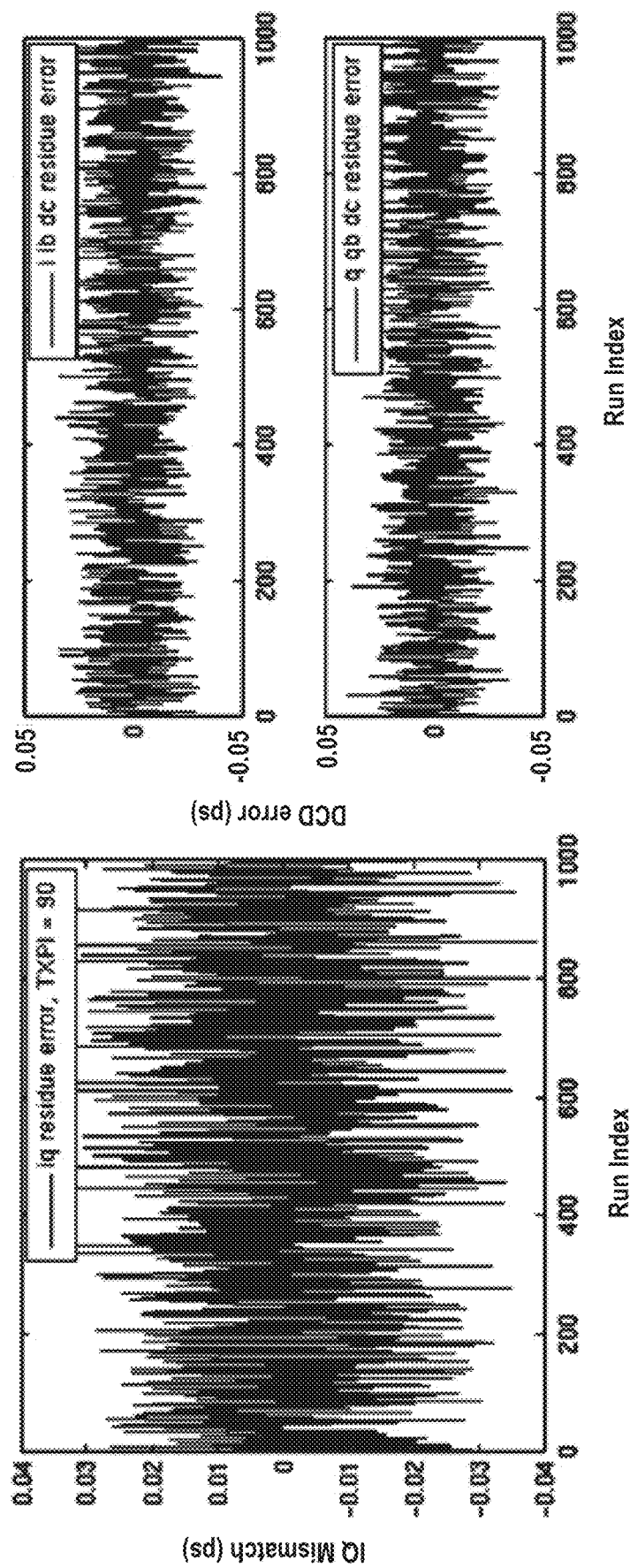
FIG. 11 shows exemplary simulation results of IQ mismatch and DCD errors after clock calibration based on the subject technology.

FIG. 11 shows exemplary simulation results of IQ mismatch and DCD errors after clock calibration based on the subject technology. Assuming that the transmitter IQ mismatch and DCD error each has a standard deviation of 500 fs prior to calibration, the advantage of applying the proposed calibration method is shown in FIG. 11. This figure shows 1000 Monte Carlo simulation results of IQ mismatch and DCD error after the proposed clock calibration. The horizontal axis is the run index, vertical index is IQ mismatch error (left side) and DCD error (right side) with the unit of ps (picoseconds). As shown in FIG. 11, post calibration IQ mismatch and DCD error is all below 40 fs, which is much smaller than the error prior to calibration.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A circuit for clock calibration comprising:
  a clock generator configured to receive two-level data symbols from a transmitted data path driven by four quarter-rate clocks and to generate four calibration clocks internally based on the four quarter-rate clocks, each calibration clock having a same period of the two-level data symbols with certain time delays;

a delay tuner configured to retime a rising edge of one of the four calibration clocks; and a phase detector combined with the delay tuner in a feedback loop to determine a coarse parameter and a set of fine parameters based on an alignment between a retimed rising edge of the calibration clock and a rising edge of the two-level data symbol with a corresponding time delay, wherein the set of fine parameters are used for calibrating the four quarter-rate clocks;

wherein an n-th one of the two-level data symbols has a period of P unit intervals (UIs) with a rising edge launched by an n-th one of the four quarter-rate clocks, wherein P is an integer multiple of 4 and n is sequentially selected from 1, 2, and 3.

2. The circuit of claim 1, wherein the clock generator comprises a divider configured to divide down by 2 from the four quarter-rate clocks into eight clocks each having a period of 8 UIs and sequentially time-shifted by one UI, to separate the eight clocks to four pairs of complementary clocks each pair having 4-UI spacing from each other, and to divide down by P/8 using rising edge and falling edge of the first one of the eight clocks to generate two secondary clocks each having a period of P UIs and a spacing of 4 UIs.

3. The circuit of claim 2, wherein the clock generator further comprises four differential flip-flop circuits arranged in a layout with a first flip-flop circuit being configured to retime a first secondary clock in association with the first pair of complementary clocks to output a first calibration clock, a second flip-flop circuit being configured to retime the first calibration clock in association with the third pair of complementary clocks to output a third calibration clock that is 2M UIs delay from the first calibration clock, a third flip-flop circuit being configured to retime the second secondary clock in association with the fourth pair of complementary clocks to output a second calibration clock that is M UIs delay from the first calibration clock, and a fourth flip-flop circuit being configured to retime the second calibration clock in association with the second pair of complementary clocks to output a fourth calibration clock that is 3M UIs delay from the first calibration clock.

4. The circuit of claim 3, wherein the clock generator comprises a 4-to-1 time-multiplexer configured to have four inverters with high-impedance in mega Q range respectively receiving the four calibration clocks and to select a k-th calibration clock of the four calibration clocks having a calibration rising edge launched at respective (k−1) M UIs delay upon a control signal applied to the respective four inverters, wherein M is one less than an integer multiple of 4 and k is selected from 1, 2, 3, and 4 for each selection of n.

5. The circuit of claim 3, wherein the clock generator further comprises a first dummy load added after the second flip-flop circuit and a second dummy load added after the fourth flip-flop circuit to achieve load balance.

6. The circuit of claim 4, wherein the delay-tuner comprises a first tunable delay circuit configured to set a range of the alignment between the retimed rising edge of the calibration clock and a rising edge launched by the n-th quarter-rate clock having respective n−1+(k−1) M UIs delay by setting an n-th coarse parameter, and a second tunable delay circuit configured to determine a (k+4(n−1))-th fine parameter by achieving the alignment within the range over L stages each having N linear steps, each step being 40 fs or smaller, where L and N are integers, the k=1, 2, 3, 4 for each n=1, 2, 3.

7. The circuit of claim 6, wherein each of the L stages comprises two inverters in serial configuration followed by a tunable capacitor in shunt configuration, wherein the tunable capacitor comprises N branches of transistor switches and MOS capacitors, the transistor switches being independently turned on or off by digital control signals.

8. A method for calibrating clocks for a quarter-rate transmitter comprising:

generating three two-level data symbols from a transmitted data path driven by four quarter-rate clocks, each two-level data symbol having a rising edge launched by one of the four quarter-rate clocks;

generating four calibration clocks in a calibration path based on the four quarter-rate clocks, each of the four calibration clocks having a same period of the two-level symbols and sequential time delays;

retiming the calibration rising edge based on a feedback signal to yield a retimed rising edge;

shifting the rising edge of the two-level data symbol to have a shifted rising edge having additional delay;

comparing the retimed rising edge with the shifted rising edge to generate the feedback signal until an alignment between the corresponding two rising edges is reached;

selecting n-th one of the three two-level data symbols having a period of P unit intervals (UIs) with the rising edge launched by the n-th one of the four quarter-rate clocks, wherein P is an integer multiple of 4, n is selected from 1, 2, 3.

9. The method of claim 8, further comprising:

selecting k-th one of the four calibration clocks with a calibration rising edge having a time delay of (k−1) M UIs, where M is one less than an integer multiple of 4, k is selected from 1, 2, 3, 4;

shifting the rising edge launched by the n-th one of the four quarter-rate clocks to obtain a shifted rising edge having a time delay of n−1+(k−1) M UIs;

recording (k+4(n−1))-th fine parameters per each n-th coarse parameter associated with the retimed rising edge and the shifted rising edge based on the alignment;

deriving a first error associated with a mismatch between in-phase and quadrature parts of the quarter-rate clocks based on at least the first through 8-th fine parameters; and deriving a second error associated with duty-cycle of in-phase part of the quarter-rate clocks based on at least the first, third, 9-th, and 11-th fine parameters; and deriving a third error associated with duty-cycle of quadrature part of the quarter-rate clocks based on at least the second, fourth, 10-th, and 12-th fine parameters;

wherein the first error, the second error, and the third error are independent from skews in the four calibration clocks.

10. The method of claim 9, further comprising:

making error corrections to the quarter-rate clocks based on the first error, the second error, and the third error;

determining calibrated quarter-rate clocks through iterations; and transmitting data symbols launched by the calibrated quarter-rate clocks.

11. The method of claim 8, further comprising:

deriving a first error associated with a mismatch between in-phase and quadrature parts of the quarter-rate clocks based on calculating a first sum of the first fine parameter minus the second fine parameter plus the third fine parameter minus the fourth fine parameter plus the sixth fine parameter minus the fifth fine parameter plus the eighth fine parameter minus the seventh fine parameter, and dividing the first sum by 4;

deriving a second error associated with duty-cycle of in-phase part of the quarter-rate clocks based on calculating a second sum of the first fine parameter minus the third fine parameter plus the fourth fine parameter minus the second fine parameter plus the seventh fine parameter minus the fifth fine parameter plus the sixth fine parameter minus the eighth fine parameter, and dividing the second sum by 2; and deriving a third error associated with duty-cycle of quadrature part of the quarter-rate clocks based on calculating a third sum of the third fine parameter minus the first fine parameter plus the fourth fine parameter minus the second fine parameter plus the fifth fine parameter minus the seventh fine parameter plus the sixth fine parameter minus the eighth fine parameter, and dividing the third sum by 2.

12. The method of claim 11, wherein deriving each of the first error, the second error, and the third error is independently from each of the n-th coarse parameter and any offset of comparing the retimed rising edge with the shifted rising edge.

13. The method of claim 8, wherein generating the four calibration clocks comprises dividing down the four quarter-rate clocks into eight clocks each having a period of 8 UIs and one UI sequential delay;

separating the eight clocks to four pairs of complementary clocks, each pair including two of the eight clocks separated by 4 UIs;

dividing down by P/8 from the first clock of the eight clocks via its rising edge and falling edge to generate two secondary clocks each having a period of P UIs and a spacing of 4 UIs;

generating the first calibration clock using a first differential flip-flop block configured to retime a first one of the two secondary clocks based on a first pair of complementary clocks including the first clock with 0 delay and the fifth clock with 4 UIs delay;

generating the second calibration clock using a third differential flip-flop block configured to retime a second one of the two secondary clocks based on a fourth pair of complementary clocks including the fourth clock with 3 UIs time delay and the eighth clock with 7 UIs delay;

generating the third calibration clock using a second differential flip-flop block configured to retime the first calibration clock based on a third pair of complementary clocks including the third clock with 2 UIs delay and the seventh clock with 6 UIs delay; and generating the fourth calibration clock using a fourth differential flip-flop block configured to retime a second calibration clock based on a second pair of complementary clocks including the second clock with 1 UI delay and the sixth clock with 5 UIs delay.

14. The method of claim 9, wherein retiming the rising edge of the k-th calibration clock comprises using a coarse delay tuner to determine a first coarse parameter defining a range of the alignment between the retimed rising edge and the shifted rising edge for k=1, using a fine delay tuner to determine a first fine parameter within the range, the first fine parameter being tunable based on L stages each yielding N linear steps and each step size being 40 fs or smaller, then fixing the first coarse parameter to tune the fine delay tuner to respectively determine subsequent three fine parameters for k=2, 3, and 4.

15. A circuit for clock calibration in background comprising:

a replica data path coupled to a tap of a transmitted data path, the replica data path being configured to generate a two-level data symbol based on quarter-rate clocks used for data communication in the transmitted data path, the two-level data symbol having a period of P unit intervals (UIs) with a rising edge launched by n-th quarter-rate clock, wherein P is an integer multiple of 4 and n is sequentially selected from 1, 2, and 3;

a clock generator configured to generate four calibration clocks based on the quarter-rate clocks, each calibration clock having the period of P UIs and being M UIs spaced apart, and to sequentially select a k-th calibration clock of the four calibration clocks having a rising edge launched at respective (k−1) M UIs delay, wherein M is one less than an integer multiple of 4 and k is selected from 1, 2, 3, and 4 for each selection of n;

a delay-tuner configured to tune the rising edge of the k-th calibration clock based on a feedback signal to yield a retimed rising edge; and a phase detector configured to generate the feedback signal by comparing the retimed rising edge with the rising edge launched by the n-th quarter-rate clock having respective n−1+(k−1) M UIs delay and to determine an n-th coarse parameter and respective (k+4(n−1))-th fine parameters based on alignment of the corresponding two rising edges.

16. The circuit of claim 15, wherein the replica data path comprises four quarter-rate data paths and a 4-to-1 time-multiplexer circuit, each quarter-rate data path being configured to generate one of 4 pairs of differential data inputs with the period of P UIs and consecutive 1 UI time delay, each pair of differential data inputs being launched by respective one of the four quarter-rate clocks, each pair of differential data inputs comprising a first data input and a second data input inverted with an opposite phase of the first data input.

17. The circuit of claim 16, wherein the 4-to-1 time-multiplexer circuit comprises a retimer comprising four sets of flip-flop and latch circuits respectively in the four quarter-rate data paths, the retimer being configured to retime a first set of 4 first data inputs respectively from the 4 pairs of differential data inputs using respect rising edges of the four quarter-rate clocks to generate a first set of 4 third data inputs having consecutively 1 UI delay, and to further retime the first set of 4 third data inputs using the respect subsequent falling edges of the four quarter-rate clocks to generate a second set of 4 fourth data inputs having consecutively time-shifted by 1 UI, one of the 4 fourth data inputs being shifted by 2 UIs from respective one of the 4 third data inputs.

18. The circuit of claim 17, wherein the retimer further is configured to retime a second set of 4 second data inputs respectively from the 4 pairs of differential data inputs using respect rising edges of the four quarter-rate clocks to generate a third set of 4 fifth data inputs having consecutively 1 UI delay, and to further retime the third set of 4 fifth data inputs using respect subsequent falling edges of the four quarter-rate clocks to generate a fourth set of 4 sixth data inputs having consecutively 1 UI delay, one of the 4 sixth data inputs being shifted by 2 UIs from respective one of the 4 fifth data inputs.

19. The circuit of claim 18, wherein the 4-to-1 time-multiplexer circuit further comprises a first logic selector circuit configured to generate a first data output based on the first set of the 4 third data inputs and the second set of the 4 fourth data inputs, and a second logic selector circuit configured to generate a second data output based on the third set of the four fifth data inputs and the fourth set of the 4 sixth data inputs, the first data output and the second data output being complementary to each other to form a single-bit two-level data symbol with the period of P UIs and a rising edge optionally being triggered by one of the four quarter-rate clocks.

* * * * *